(12) United States Patent
Ehrensperger et al.

(10) Patent No.: US 9,846,265 B2
(45) Date of Patent: *Dec. 19, 2017

(54) TRANSPARENT ELEMENT WITH DIFFUSE REFLECTION COMPRISING A SOL-GEL LAYER

(71) Applicant: SAINT-GOBAIN GLASS FRANCE, Courbevoie (FR)

(72) Inventors: Marie-Virginie Ehrensperger, Aix-les-bains (FR); François Guillemot, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/414,335

(22) PCT Filed: Jul. 11, 2013

(86) PCT No.: PCT/FR2013/051657
§ 371 (c)(1),
(2) Date: Jan. 12, 2015

(87) PCT Pub. No.: WO2014/009663
PCT Pub. Date: Jan. 16, 2014

(65) Prior Publication Data
US 2015/0192707 A1    Jul. 9, 2015

(30) Foreign Application Priority Data

Jul. 13, 2012   (FR) ...................... 12 56760

(51) Int. Cl.
*G02B 5/02* (2006.01)
*B32B 17/10* (2006.01)
(Continued)

(52) U.S. Cl.
CPC ...... *G02B 5/0289* (2013.01); *B32B 17/10018* (2013.01); *B32B 17/10036* (2013.01);
(Continued)

(58) Field of Classification Search
CPC ...... G02B 5/0289; G02B 1/04; G02B 5/0236; G02B 5/0257; G02B 5/0278;
(Continued)

(56) References Cited

U.S. PATENT DOCUMENTS 4,173,778 A * 11/1979 Snavely .................. F21V 3/04
362/297
5,194,990 A * 3/1993 Boulos .................. G02B 1/115
359/586
(Continued)

FOREIGN PATENT DOCUMENTS

EP        0 847 965 A1   6/1998
FR    WO 2012104547 A1 *  8/2012 ............ B32B 17/10
(Continued)

OTHER PUBLICATIONS

International Search Report issued in International Patent Application No. PCT/FR2013/051657, dated Oct. 16, 2013.

*Primary Examiner* — Bumsuk Won
*Assistant Examiner* — Wen Huang
(74) *Attorney, Agent, or Firm* — Pillsbury Winthrop Shaw Pittman LLP

(57) ABSTRACT

A transparent layered element with diffuse reflection properties includes two outer layers made of dielectric materials having substantially the same refractive index and a central layer intercalated between the two outer layers, formed either from a single layer which is a dielectric layer with a refractive index different from that of the outer layers or a metallic layer, or from a stack of layers which includes at least one dielectric layer with a refractive index different
(Continued)

from that of the outer layers or a metallic layer. The upper outer layer is a sol-gel layer including a silica-based organic/inorganic hybrid matrix.

21 Claims, 5 Drawing Sheets

(51) Int. Cl.
  *G02B 27/01* (2006.01)
  *G02B 1/04* (2006.01)

(52) U.S. Cl.
  CPC ......... *B32B 17/10587* (2013.01); *G02B 1/04* (2013.01); *G02B 5/0236* (2013.01); *G02B 5/0257* (2013.01); *G02B 5/0278* (2013.01); *G02B 27/0101* (2013.01); *G02B 2027/0118* (2013.01); *G02B 2027/0194* (2013.01)

(58) Field of Classification Search
  CPC ........ G02B 27/0101; G02B 2027/0118; G02B 2027/0194; B32B 17/10018; B32B 17/10036; B32B 17/10587
  USPC .............................................. 359/599; 3/599
  See application file for complete search history.

(56) References Cited

U.S. PATENT DOCUMENTS

| | | | |
|---|---|---|---|
| 7,348,054 B2* | 3/2008 | Jacquiod | C03C 17/007 428/312.2 |
| 7,955,687 B2* | 6/2011 | Nghiem | C03C 17/007 427/585 |
| 2003/0161997 A1* | 8/2003 | Moran | B32B 3/30 428/172 |
| 2005/0014088 A1* | 1/2005 | Nakamura | C08F 220/10 430/270.1 |
| 2008/0198320 A1* | 8/2008 | Chwu | G02F 1/133305 349/158 |
| 2009/0316262 A1 | 12/2009 | Kittaka et al. | |
| 2011/0104401 A1* | 5/2011 | Ho | B82Y 30/00 428/1.32 |
| 2011/0232752 A1* | 9/2011 | Mataki | C09K 11/06 136/257 |
| 2012/0091488 A1* | 4/2012 | Vermersch | C03C 17/007 257/98 |
| 2013/0105073 A1* | 5/2013 | Reuter | B26B 9/00 156/267 |
| 2014/0104690 A1* | 4/2014 | Sandre-Chardonnal | B32B 17/10 359/599 |

FOREIGN PATENT DOCUMENTS

| | | |
|---|---|---|
| WO | 02/48065 A1 | 6/2002 |
| WO | 2012/104547 A1 | 8/2012 |

* cited by examiner

TRANSPARENT ELEMENT WITH DIFFUSE REFLECTION COMPRISING A SOL-GEL LAYER

CROSS-REFERENCE TO RELATED APPLICATIONS

This application is the U.S. National Stage of PCT/FR2013/051657, filed Jul. 11, 2013, which in turn claims priority to French Application No. 1256760, filed Jul. 13, 2012. The contents of all of these applications are incorporated herein by reference in their entirety.

The present invention relates to an element in transparent layers with diffuse reflection properties.

The layered element may be rigid or flexible. It may in particular be a glazing, for example made based on glass or polymer material. It may also be a flexible film based on polymer material, which is especially capable of being applied to a surface in order to give it diffuse reflection properties while at the same time preserving its transmission properties.

The known glazings comprise standard transparent glazings, which give rise to specular transmission and reflection of incident radiation on the glazing, and translucent glazings, which give rise to diffuse transmission and reflection of incident radiation on the glazing.

Usually, reflection by a glazing is said to be diffuse when incident radiation on the glazing with a given incident angle is reflected by the glazing in a plurality of directions. Reflection by a glazing is said to be specular when incident radiation on the glazing with a given incident angle is reflected by the glazing with a reflection angle equal to the incident angle. Similarly, transmission through a glazing is said to be specular when incident radiation on the glazing with a given incident angle is transmitted by the glazing with a transmission angle equal to the incident angle.

A drawback of standard transparent glazings is that they return sharp reflections, like mirrors, which is not desirable in certain applications. Thus, when a glazing is used for a building window or a display screen, it is preferable to limit the presence of reflections, which reduce the visibility through the glazing. Sharp reflections on a glazing may also give rise to risks of dazzling, with consequences in terms of safety, for example when vehicle headlights reflect on glazed facades of buildings. This problem most particularly arises for the glazed facades of airports. Indeed, it is essential to eliminate any risk of dazzling of pilots on approach to terminals.

Moreover, translucent glazings, although having the advantage of not generating sharp reflections, do not, however, afford clear vision through the glazing.

It is these drawbacks that the invention more particularly intends to remedy by proposing layered element which makes it possible both to have excellent clean vision through the element and to limit the reflections of "mirror" type on the element, while also promoting the diffuse reflections on the element.

The Applicant has discovered that the use of an element in transparent layers with particular diffuse reflection used in a glazing makes it possible to obtain a glazing that is transparent in transmission and that has diffuse reflection. These properties are especially obtained by means of a particular stack of layers which have defined refraction indices and a defined geometry. In summary, the layered element comprises a central layer consisting of dielectric or metallic materials, preferably a thin layer or a stack of thin layers, surrounded by two outer layers, an upper outer layer and a lower outer layer consisting of dielectric materials having substantially the same refractive index. In this layered element, each contact surface ($S_0$, $S_1$, ..., $S_k$) between two adjacent layers of the layered element, one of which is dielectric and the other metallic, or which are both dielectric layers of different refractive indices, is textured and parallel to the other textured contact surfaces between two adjacent layers, one of which is dielectric and the other metallic or which are both dielectric layers with different refractive indices.

The Applicant has discovered that the advantageous properties of the layered element of the invention are due in particular to the index harmony between the outer layers, i.e. the fact that these two layers have substantially the same refractive index. According to the invention, the index harmony or index difference corresponds to the absolute value of the difference in refractive index at 589 nm between the constituent dielectric materials of the outer two layers of the layered element. The smaller the index difference, the clearer will be the vision through the glazing. The Applicant has discovered that excellent vision is obtained with an index harmony of less than 0.050, preferably less than 0.030 and better still less than 0.015.

Several configurations and processes for preparing the layered element may be envisaged, varying especially in the choice of the materials constituting the lower external layer and the central layer. The lower external layer consisting of dielectric materials is chosen from:

- transparent substrates, one of the main surfaces of which is textured and the other smooth, preferably substrates made of mineral or organic glass, chosen from polymers, glasses and ceramics,
- layers of dielectric material, deposited, for example, by magnetron sputtering, chosen from the oxides, nitrides or halides of one or more transition metals, non-metals or alkaline-earth metals,
- layers based on curable materials that are initially in a viscous, liquid or pasty state, adapted to forming operations comprising:
  - photocrosslinkable and/or photopolymerizable materials,
  - layers deposited via a sol-gel process,
- inserts or sheets of thermoformable or pressure-sensitive plastic material which may preferably be based on polymers chosen from polyvinyl butyrals (PVB), polyvinyl chlorides (PVC), polyurethanes (PU), polyethylene terephthalates (PET) or ethylene-vinyl acetate (EVA) copolymers.

Among these materials, some are particularly advantageous with regard to their availability and/or their price, for example coarse or textured glass substrates such as Satinovo® sold by Saint-Gobain.

As explained above, to obtain particularly clear vision through the glazing, the variation in refractive index between the lower outer layer consisting of a coarse substrate and the material constituting the upper outer layer of the layered element is preferably less than 0.050 and better still less than 0.015.

However, among the materials proposed for making the upper outer layers, it is not always possible to obtain a variation in index as low as 0.015. For example, for standard glasses, the index of a glass of the same type may vary from one factory to another between 1.517 and 1.523. This variation of the order of 0.006 is non-negligible in the face of the preferential acceptance range of index difference for a glazing comprising the transparent element with diffuse reflection.

Consequently, when a textured glass substrate is chosen as lower outer layer, it is not possible, if excellent clearness is sought, to chose as upper outer layer all the types of materials in the list given above for the lower outer layers.

The Applicant has discovered, surprisingly, that the specific use of a particular sol-gel layer as upper outer layer of the layered element makes it possible readily to prepare transparent elements in layers with diffuse reflection with index harmonies that may especially be less than 0.015. The sol-gel layer of the invention has, depending on the proportions of the various precursor compounds constituting it, an adaptable refractive index that may especially vary within a range from 1.459 to 1.700 and preferably from 1.502 to 1.538.

By means of the solution of the invention, it is thus possible to adapt with precision the refractive index so as to ensure that the index difference between the lower outer layer and the upper outer layer is less than a defined value.

The flexible formulation in terms of index of the sol-gel layer of the invention makes it possible to obtain transparent elements in layers which have a constant quality in terms of optical performance, irrespective of the source of the substrate or the nature of the substrate. Furthermore, it is also possible to use as lower outer layer plastic substrates with a significantly higher index.

The specific choice of a sol-gel layer as upper outer layer of the layered element makes it possible:
- to precisely harmonize with the index of the lower outer layer, whereas this is not possible with other types of outer layer,
- to adapt to the precise index of the glass as a function of its source,
- to obtain a composition that is adjustable as a function of the nature of the lower outer layer, whether it is mineral or organic,
- to add a component giving a colored aspect to the sol-gel layer,
- to apply the outer layer to complex surfaces of various sizes, without the need for heavy equipment;
- to obtain deposits that are homogeneous in surface, in composition and in thickness.

To this end, the subject of the invention is a transparent layered element (1) having two main smooth outer surfaces (2A, 4A), characterized in that the layered element comprises:
- two outer layers, a lower outer layer (2) and an upper outer layer (4), which each form one of the two main outer surfaces (2A, 4A) of the layered element and which consist of dielectric materials having substantially the same refractive index (n2, n4), and
- a central layer (3) intercalated between the outer layers, this central layer (3) being formed either by a single layer which is a dielectric layer of refractive index (n3) different from that of the outer layers or a metallic layer, or by a stack of layers ($3_1$, $3_2$, . . . , $3_k$) which comprises at least one dielectric layer with a refractive index different to that of the outer layers or a metallic layer,
- in which each contact surface ($S_0$, $S_1$, . . . , $S_k$) between two adjacent layers of the layered element, one of which is a dielectric and the other metallic, or which are both dielectric layers of different refractive indices, is textured and parallel to the other textured contact surfaces between two adjacent layers, one of which is a dielectric and the other metallic or which are both dielectric layers with different refractive indices, and in which the upper outer layer (4) is a sol-gel layer comprising an organic/inorganic hybrid matrix based on silica.

The particular layered element used according to the invention makes it possible to obtain specular transmission of incident radiation on the layered element and diffuse reflection of a radiation irrespective of the direction of the source.

The extreme clearness of vision is due to the index harmony which is adjusted as much as possible.

In the context of the invention, a distinction is made between the metallic layers, on the one hand, for which the refractive index value is unimportant, and the dielectric layers, on the other hand, for which the difference in refractive index relative to that of the outer layers is to be taken into consideration.

Throughout the description, the transparent layered element according to the invention is considered as laid horizontally, with its first face oriented downwards defining a main lower outer surface and its second face, opposite the first face, oriented upwards defining a main upper outer surface; the meanings of the terms "above" and "below" should thus be considered relative to this orientation. Unless specifically stipulated, the terms "above" and "below" do not necessarily mean that the two layers are arranged in contact with each other. The terms "lower" and "upper" are used herein in reference to this positioning.

The layered element optionally comprises at least one additional layer positioned above or below the upper and/or lower outer layers. Said additional layer(s) may consist of dielectric materials all having substantially the same refractive index as the dielectric materials of the outer layers of the layered element or having different refractive indices.

For the purposes of the invention, the term "index" refers to the optical refractive index, measured at a wavelength of 589 nm.

According to the invention, a thin layer is a layer with a thickness of less than 1 µm.

Two dielectric materials or layers have substantially the same refractive index, or have substantially equal refractive indices, when the two dielectric materials have refractive indices for which the absolute value of the difference between their refractive indices at 589 nm is less than or equal to 0.150.

According to the invention the absolute value of the difference in refractive index at 589 nm between the constituent dielectric materials of the two outer layers of the layered element is preferably, in increasing order: less than or equal to 0.050, less than or equal to 0.030, less than or equal to 0.020, less than or equal to 0.018, less than or equal to 0.015, less than or equal to 0.010, less than or equal to 0.005.

Two dielectric materials or layers have different refractive indices when the absolute value of the difference between their refractive indices at 589 nm is strictly greater than 0.15. According to an advantageous characteristic, the absolute value of the difference in refractive index at 589 nm between, on the one hand, the outer layers, and, on the other hand, at least one dielectric layer of the central layer, is greater than or equal to 0.3, preferably greater than or equal to 0.5 and more preferably greater than or equal to 0.8. This relatively large difference in refractive index intervenes on at least one textured contact surface internal to the layered element. This makes it possible to promote the reflection of radiation on this textured contact surface, i.e. diffuse reflection of the radiation by the layered element.

The contact surface between two adjacent layers is the interface between the two adjacent layers.

A dielectric material or layer is a non-metallic material or layer. Preferably, the dielectric materials or layers are of organic or mineral nature. The mineral dielectric materials or layers may be chosen from the oxides, nitrides or halides of one or more transition metals, non-metals or alkaline-earth metals preferably chosen from silicon, titanium, tin, zinc, aluminum, molybdenum, niobium, zirconium and magnesium. The organic dielectric materials or layers are chosen from polymers.

It is considered that a dielectric material or layer is a material or layer of low electrical conductivity, preferably less than 100 S/m.

A transparent element is an element through which there is transmission of radiation at least in the wavelength regions that are useful for the intended application of the element. By way of example, when the element is used as building or vehicle glazing, it is transparent at least in the visible wavelength region.

A textured or rough surface is a surface for which the surface properties vary on a larger scale than the wavelength of the incident radiation on the surface. The incident radiation is then transmitted and reflected in a diffuse manner by the surface. Preferably, a textured or rough surface according to the invention has a roughness parameter corresponding to the arithmetic mean difference Ra of at least 0.5 µm, especially between 1 and 100 µm and better still between 1 and 5 µm (corresponding to the arithmetic mean of all the absolute distances of the profile of roughness R measured from a median line of the profile over an evaluation length).

A smooth surface is a surface for which the surface irregularities are such that the radiation is not deviated by these surface irregularities. The incident radiation is then transmitted and reflected in a specular manner by the surface. Preferably, a smooth surface is a surface for which the surface irregularities have dimensions less than the wavelength of the incident radiation on the surface. However, according to the invention, the surfaces of outer layers or of additional layers which have certain surface irregularities but which are in contact with one or more additional layers consisting of dielectric materials having substantially the same refractive index and which have, on their face opposite that which is in contact with said layer presenting certain irregularities, a surface for which the surface irregularities have dimensions that are very much smaller or very much greater (large-scale undulations) than the wavelength of the incident radiation on the surface are considered as smooth. Preferably, a smooth surface is a surface having either a roughness parameter corresponding to the arithmetic mean difference Ra of less than 0.10 µm and preferably less than 0.01 µm, or slopes of less than 10°.

A glazing corresponds to an organic or mineral transparent substrate.

By means of the invention, specular transmission and diffuse reflection of incident radiation on the layered element are obtained. The specular transmission ensures clear vision through the layered element. The diffuse reflection makes it possible to avoid sharp reflections on the layered element and the risks of dazzling.

The diffuse reflection on the layered element arises from the fact that each contact surface between two adjacent layers, one of which is a dielectric and the other metallic or which are both dielectric layers of different refractive indices, is textured. Thus, when incident radiation on the layered element reaches such a contact surface, it is reflected by the metallic layer or due to the difference in refractive index between the two dielectric layers and, since the contact surface is textured, the reflection is diffuse.

The specular transmission arises from the fact that the two outer layers of the layered element have smooth main outer surfaces and consist of materials having substantially the same refractive index, and in that each textured contact surface between two adjacent layers of the layered element, one of which is a dielectric and the other metallic or which are both dielectric layers with different refractive indices, is parallel to the other textured contact surfaces between two adjacent layers, one of which is a dielectric and the other metallic or which are both dielectric layers of different refractive indices.

The smooth outer surfaces of the layered element allow specular transmission of radiation at each air/outer layer interface, i.e. they allow the entry of radiation from the air into an outer layer, or the exit of radiation from an outer layer into the air, without modification of the direction of the radiation.

The parallelism of the textured contact surfaces implies that the or each constituent layer of the central layer, which is the dielectric with a refractive index different to that of the outer layers, or which is metallic, has a uniform thickness perpendicular to contact surfaces of the central layer with the outer layers.

This thickness uniformity may be global over the entire extent of the texture, or local on sections of the texture. In particular, when the texture has variations in slope, the thickness between two consecutive textured contact surfaces may change, per section, as a function of the slope of the texture, the textured contact surfaces always remaining, however, parallel to each other. This case especially arises for a layer deposited by cathodic sputtering, where the thickness of the layer is proportionately smaller the more the slope of the texture increases. Thus, locally, on each section of texture having a given slope, the thickness of the layer remains constant, but the thickness of the layer is different between a first section of texture having a first slope and a second section of texture having a second slope different from the first slope.

Advantageously, in order to obtain parallelism of the textured contact surfaces inside the layered element, the or each constituent layer of the central layer is a layer deposited by cathodic sputtering. Specifically, cathodic sputtering, in particular magnetic field-assisted cathodic sputtering, ensures that the surfaces delimiting the layer are parallel with each other, which is not the case for other deposition techniques such as evaporation or chemical vapor deposition (CVD), or alternatively the sol-gel process. Now, the parallelism of the textured contact surfaces inside the layered element is essential for obtaining specular transmission through the element.

Radiation incident on a first outer layer of the layered element passes through this first outer layer without modification of its direction. Due to the difference in nature, dielectric or metallic, or of the difference in refractive index between the first outer layer and at least one layer of the central layer, the radiation is then refracted in the central layer. As, on the one hand, the textured contact surfaces between two adjacent layers of the layered element, one of which is a dielectric and the other metallic or which are both dielectric layers of different refractive indices, are all parallel with each other, and, on the other hand, the second outer layer has substantially the same refractive index as the first outer layer, the refraction angle of the radiation in the second outer layer from the central layer is equal to the incident angle of the radiation on the central layer from the first outer layer, in accordance with the Snell-Descartes law for refraction.

The radiation thus emerges from the second outer layer of the layered element in a direction that is the same as its incident direction on the first outer layer of the element. The transmission of the radiation by the layered element is thus specular. Clear vision is thus obtained through the layered element, i.e. without the layered element being translucent, by virtue of the specular transmission properties of the layered element.

According to one aspect of the invention, the diffuse reflection properties of the layered element are exploited to reflect a large part of the radiation, in a plurality of directions, on the incident side of the radiation. This strong diffuse reflection is obtained while at the same time having clear vision through the layered element, i.e. without the layered element being translucent, by virtue of the specular transmission properties of the layered element. Such a transparent layered element with strong diffuse reflection finds application, for example, for display or projection screens.

The upper outer layer is a sol-gel layer comprising an organic/inorganic hybrid matrix based on silica obtained according to a sol-gel process.

The sol-gel process consists, in a first stage, in preparing a solution known as a "sol-gel solution" containing precursors that give rise in the presence of water to polymerization reactions. When this sol-gel solution is deposited on a surface, by means of the presence of water in the sol-gel solution or on contact with the ambient moisture, the precursors become hydrolyzed and condense to form a network trapping the solvent. These polymerization reactions result in the formation of increasingly condensed species, which lead to colloidal particles forming sols and then gels. The drying and densification of these gels, at a temperature of the order of a few hundred degrees, leads, in the presence of a silica-based precursor, to a sol-gel layer corresponding to a glass whose characteristics are similar to those of a standard glass.

Due to their viscosity, the sol-gel solutions, in the form of a colloidal solution or of a gel, may be readily deposited on the main textured surface of the central layer opposite the first outer layer, conforming to the texture of this surface. The sol-gel layer will "fill in" the roughness of the central layer. Specifically, this layer comprises a surface which embraces the surface roughness of the central layer, which is thus textured, and a main outer surface opposite this surface, which is flat. The layers deposited by a sol-gel process thus make planar the surface of the layered element.

According to the invention, the sol-gel layer comprises a silica-based organic/inorganic hybrid matrix. This matrix is obtained from mixed precursors which are organosilanes $R_n SiX_{(4-n)}$. These molecules simultaneously comprise hydrolyzable functions which give rise to a silica network or matrix comprising organic functions which remain attached to the silica backbone.

According to one variant of the invention, the sol-gel layer also comprises particles of at least one metal oxide or of at least one chalcogenide.

According to another variant of the invention, the silica-based organic/inorganic hybrid matrix also comprises at least one metal oxide. Such a silica-based matrix comprising organic functions and at least one metal oxide may be obtained from the combined use of organosilane and of at least one precursor of a metal oxide. These precursors then form with the organosilane a hybrid matrix of silica and of metal oxide.

According to the preferred embodiment of the invention, the sol-gel layer comprises a silica-based organic/inorganic hybrid matrix and at least one metal oxide in which are dispersed particles of at least one metal oxide or of at least one chalcogenide such as an organic/inorganic hybrid matrix of silica and of zirconium oxide in which are dispersed titanium dioxide particles.

The main compounds of the sol-gel layer of the invention consist of the compounds forming the matrix and of the particles dispersed in said matrix. The main compounds of the sol-gel layer may thus be:
  the silica comprising organic functions of the matrix,
  the metal oxide(s) of the matrix,
  the metal oxide and/or chalcogenide particles dispersed in the matrix.

To adapt with precision the refractive index of the sol-gel layer, the proportions of metal oxides originating from the matrix or dispersed in the form of particles are modified. As a general rule, the metal oxides have a higher refractive index than that of silica. By increasing the proportions of metal oxide, the refractive index of the sol-gel layer is increased. The refractive index of the sol-gel layer increases linearly as a function of the volume fraction of one type of metal oxide for volume proportions of said metal oxide less than a threshold value. For example, when $TiO_2$ particles are added, a linear variation in the refractive index of the sol-gel layer is observed for volume proportions of $TiO_2$ relative to the total volume of the main compounds of the sol-gel layer of less than 20%.

It is thus possible to determine theoretically the refractive index of a sol-gel layer as a function of the main compounds constituting it and thus to determine theoretically the formulation of a sol-gel solution which will make it possible to obtain after curing a sol-gel layer having the required refractive index.

The solution of the invention is thus particularly advantageous. For example, on receiving glass substrates intended to be used as lower outer layer, their refractive index is measured. Next, a sol-gel solution is formulated which will give after curing a sol-gel layer having a refractive index harmony with said substrate of less than 0.015.

The sol-gel layers may have a refractive index varying within a wide index range especially 1.459 to 1.700, preferably 1.502 to 1.538 and better still from 1.517 to 1.523.

The main compounds of the sol-gel layer represent by mass relative to the total mass of the sol-gel layer, preferably in increasing order, at least 80%, at least 90%, at least 95%, at least 99%, 100%.

The sol-gel layer preferably comprises by mass relative to the total mass of the main compounds constituting the sol-gel layer:
  50% to 100%, preferably 70% to 95% and better still 85% to 90% of silica comprising organic functions of the matrix, and/or
  0 to 10%, preferably 1% to 5% and better still 2% to 4% of metal oxide of the matrix, and/or
  0 to 40%, preferably 1% to 20% and better still 5% to 15% of metal oxide and/or chalcogenide particles dispersed in the matrix.

The volume proportions of the metal oxide particles relative to the total volume of the main compounds of the sol-gel layer is, preferably by increasing order, between 0 and 25%, between 1% and 25%, between 2% and 8%.

The sol-gel layer is obtained by curing a sol-gel solution and comprises the product resulting from the hydrolysis and condensation of at least one organosilane of general formula $R_nSiX_{(4-n)}$ in which:

n is equal to 1, 2, 3, preferably n is equal to 1 or 2 and better still n is equal to 1, the groups X, which may be identical or different, represent hydrolyzable groups chosen from alkoxy, acyloxy and halide groups, preferably alkoxy groups, and the groups R, which may be identical or different, represent non-hydrolyzable organic groups (or organic functions) bonded to silicon via a carbon atom.

Preferably, the sol-gel layer is obtained by curing a sol-gel solution and comprises the product resulting from the hydrolysis and condensation of:

i) at least one organosilane and
ii) at least one precursor of a metal oxide and/or
iii) particles of at least one metal oxide or of at least one chalcogenide.

The metal oxide particles and/or the precursors of the metal oxides of the organic/inorganic hybrid matrix comprise a metal chosen from titanium, zirconium, zinc, niobium, aluminum and molybdenum.

The organosilane(s) comprise 2 or 3 and in particular 3 hydrolyzable groups X, and one or two, in particular one, non-hydrolyzable group R.

The groups X are preferentially chosen from alkoxy groups —O—R', in particular C1-C4 alkoxy, acyloxy groups —O—C(O)R' in which R' is an alkyl radical, preferentially of C1-C6, preferably methyl or ethyl, halide such as Cl, Br and I, and combinations of these groups. Preferably, the groups X are alkoxy groups and in particular methoxy or ethoxy.

The group R is a non-hydrolyzable hydrocarbon-based group. A certain number of groups are suitable according to the invention. The presence and nature of these groups makes it possible to obtain sol-gel layers having thicknesses that are compatible with the applications of the invention. Preferably, the group R corresponding to the non-hydrolyzable organic function has a molar mass of at least 50 g/mol and preferably of at least 100 g/mol. This group R is thus an unremovable group, even after the drying step, and may be chosen from:

alkyl groups, preferably linear or branched C1 to C10 and more preferably C3 to C10 alkyl groups, for instance methyl, ethyl, propyl, n-butyl, i-butyl, sec-butyl and tert-butyl groups;

alkenyl groups, preferably C2 to C10 alkenyl groups, for instance vinyl, 1-propenyl, 2-propenyl and butenyl groups;

alkynyl groups, for instance acetylenyl and propargyl groups;

aryl groups, preferably C6 to C10 aryl groups, such as phenyl and naphthyl groups;

alkylaryl groups;

arylalkyl groups;

(meth)acryl and (meth)acryloxypropyl groups;

glycidyl and glycidyloxy groups.

The groups defined above such as the alkyl, alkenyl, alkynyl, alkylaryl and arylalkyl groups may also comprise at least one group chosen from primary, secondary or tertiary amine (the non-hydrolyzable radical is then, for example, an aminoaryl or aminoalkyl group), amide, alkylcarbonyl, substituted or unsubstituted aniline, aldehyde, ketone, carboxyl, anhydride, hydroxyl, alkoxy, alkoxycarbonyl, mercapto, cyano, hydroxyphenyl, alkyl carboxylate, sulfonic acid, phosphoric acid or meth(acryloxyloxy) groups, groups comprising an epoxide ring such as glycidyl and glycidyloxy and allyl and vinyl groups.

The particularly preferred organosilanes comprise identical or different, preferably identical, groups X and represent a hydrolyzable group, preferably a C1 to C4 alkoxy group, more preferably an ethoxy or methoxy group; and R is a non-hydrolyzable group, preferably a glycidyl or glycidyloxy C1 to C20 and preferably C1 to C6 alkylene group, for example a glycidyloxypropyl group, a glycidyloxyethyl group, a glycidyloxybutyl group, a glycidyloxypentyl group, a glycidyloxyhexyl group and a 2-(3,4-epoxycyclohexyl) ethyl group.

Advantageously, the organosilane is chosen from the following compounds: allyltrimethoxysilane, N-(2-aminoethyl)-3-aminopropyltrimethoxysilane, N—[N'-(2'-aminoethyl)-2-aminoethyl]-3-aminopropyltrimethoxysilane, 3-aminopropyltrimethoxysilane, 3-glycidoxypropyltrimethoxysilane (GLYMO), 3-mercaptopropyltrimethoxysilane, 3-methacryloxypropylmethyldimethoxysilane, 3-methacryloxypropyltrimethoxysilane, N-phenylaminopropyltrimethoxysilane, vinyltrimethoxysilane, 3-aminopropyltriethoxysilane, p-aminophenylsilane, 3-aminopropyltriethoxysilane, 3-glycidoxypropyldiisopropylethoxysilane, 3-glycidoxypropyltriethoxysilane, (3-glycidoxypropyl)methyldiethoxysilane, 3-mercaptopropyltriethoxysilane, 3-methacryloxypropylmethyldiethoxysilane, vinylmethyldiethoxysilane, vinyltriethoxysilane, N-[(3-(triethoxysilyl)propyl]-4,5-dihydroximidazole.

Among the compounds listed above, the preferred compound is GLYMO.

The metal oxide and/or chalcogenide particles dispersed in the silica-based organic/inorganic hybrid matrix are preferably chosen from the following group: $TiO_2$, $ZrO_2$, $ZnO$, $NbO$, $SnO_2$, $Al_2O_3$, $MoO_3$, $ZnS$, $ZnTe$, $CdS$, $CdSe$, $IrO_2$, $WO_3$, $Fe_2O_3$, $FeTiO_3$, $BaTi_4O_9$, $SrTiO_3$, $ZrTiO_4$, $Co_3O_4$, ternary oxide based on bismuth, $MoS_2$, $RuO_2$, $Sb_2O_4$, $Sb_2O_5$, $BaTi_4O_9$, $MgO$, $CaTiO_3$, $V_2O_5$, $Mn_2O_3$, $CeO_2$, $RuS_2$, $Y_2O_3$, $La_2O_3$.

Preferably, the particles are particles of a metal oxide comprising a metal chosen from titanium, zirconium, zinc, niobium, aluminum and molybdenum.

According to a particularly advantageous embodiment, the metal oxide is a titanium oxide ($TiO_2$), in rutile or anatase form, or a zirconium oxide ($ZrO_2$).

The particles of at least one metal oxide or of at least one chalcogenide have, preferably in increasing order, a mean diameter of less than or equal to 1 µm, less than or equal to 60 nm, less than or equal to 50 nm, less than or equal to 20 nm. The particles generally have a diameter of greater than 1 nm and better still greater than 5 nm.

The refractive index of the chalcogenide metal oxides is, preferably in increasing order, greater than 1.49, greater than 1.50, greater than 1.60, greater than 1.70, greater than 1.80, greater than 1.90, greater than 2.00, greater than 2.10, greater than 2.20.

As a commercial product that may be used, mention may be made of the product sold under the name Optolake 1120Z® (11RU7-A-8) by the company Catalyst & Chemical (CCIC) corresponding to a $TiO_2$ colloid. Mention may also be made of the product sold by the company Cristal Global under the reference S5-300A corresponding to a stable aqueous dispersion of $TiO_2$ particles at 23% by mass relative to the total mass of the dispersion, having a BET specific surface area of about 330 $m^2/g$ and a mean diameter of about 50 nm.

The metal oxide precursors may be chosen from organometallic compounds such as metal alkoxides, and metal salts, which comprise the metal elements.

The metal oxide precursors may comprise a metal chosen from titanium, zirconium, zinc, niobium, aluminum and molybdenum. Preferably, the sol-gel solution comprises at least one zirconium, aluminum or titanium oxide precursor, preferably a metal alkoxide or a metal halide. Examples of precursor compounds are the following:

$Al(OCH_3)_3$, $Al(OC_2H_5)_3$, $Al(OC_3H_7)_3$, $Al(OC_4H_9)_3$, $Al(OC_2H_4OC_4H_9)_3$, $AlCl_3$, $AlCl(OH)_2$, $TiCl_4$, $Ti(OC_2H_5)_4$, $Ti(OC_3H_7)_4$, $Ti(OC_4H_9)_4$, $Ti(2$-ethylhexoxy$)_4$, $ZrCl_4$, $Zr(OC_2H_5)_4$, $Zr(OC_3H_7)_4$, $ZrOCl_2$, $Zr(2$-ethylhexoxy$)_4$.

Preferably, the sol-gel solution according to the invention comprises a single compound chosen from zirconium alkoxides, such as zirconium tetrapropoxide (TPOZ).

The organosilanes (i), the metal oxide precursors (ii) and the metal oxides and chalcogenide (iii) are the main compounds of the sol-gel solution. The sol-gel solution comprises, besides these "main" products, additives and solvents. The additives preferably represent less than 10% and preferably less than 5% by mass relative to the total mass of the sol-gel solution.

The proportions of organosilanes, by mass relative to the total mass of the main components of the sol-gel solution, are, preferably in increasing order, between 50% and 99%, between 60% and 98%, between 70% and 95%, between 80% and 90%.

The proportions of the metal oxide precursors, by mass relative to the total mass of the main components of the sol-gel solution, are, preferably in increasing order, between 0 and 10%, between 1% and 10%, between 2% and 8%, between 4% and 7%.

The proportions of the metal oxides and chalcogenides, by mass relative to the total mass of the main components of the sol-gel solution, are, preferably in increasing order, between 0 and 40%, between 1% and 20%, between 2% and 10%, between 4% and 9%.

The sol-gel solution may comprise, in addition to the main compounds, at least one solvent and optionally at least one additive.

The solvents are chosen from water and organic solvents. The sol-gel solution preferably comprises water to allow the hydrolysis and condensation reactions. The sol-gel solution may also comprise at least one organic solvent whose boiling point, at atmospheric pressure, is preferably between 70 and 140° C. As organic solvent that may be used according to the invention, mention may be made of alcohols, esters, ketones and tetrahydropyran, and mixtures thereof. The alcohols are preferably chosen from C1-C6 alcohols, such as methanol. The esters are preferably chosen from acetates, and mention may be made in particular of ethyl acetate. Among the ketones, methyl ethyl ketone will preferably be used.

Among the suitable solvents, mention may thus be made of water, methanol, ethanol, propanol (n-propanol and isopropanol), butanol, 1-methoxy-2-propanol, 4-hydroxy-4-methyl-2-pentanone, 2-methyl-2-butanol and butoxyethanol, and water/organic solvent mixtures.

The proportions of solvent may vary within a wide range. They will especially depend on the thicknesses to be obtained. Specifically, the greater the solid content of the sol-gel solution, the more possible it is to deposit large thicknesses and thus to obtain sol-gel layers of large thicknesses.

The mass proportions of solvent relative to the total mass of the sol-gel solution may represent, for example, at least 10% and not more than 80%.

Similarly, the mass proportions of the main compounds relative to the total mass of the sol-gel solution represent, for example, at least 20% and not more than 90%.

The mass proportions of water relative to the total mass of the sol-gel solution represent, for example, between 10% and 40%, between 10% and 30% or between 15% and 25%.

When the sol-gel solution also comprises one or more organic solvents, the mass proportions of organic solvent relative to the total mass of the sol-gel solution represent, for example, between 10% and 40%, between 10% and 30% or between 15% and 25%.

The composition may also comprise various additives such as surfactants, UV absorbers, pigments or dyes, hydrolysis and/or condensation catalysts, and curing catalysts. The total proportions of the additives preferably represent less than 5% by mass relative to the total mass of the sol-gel solution.

The surfactants improve the wetting properties and promote better spreading of the composition on the surface to be coated. Among these surfactants, mention may be made of nonionic surfactants such as ethoxylated or neutral fatty alcohols, for example fluoro surfactants. Mention may be made especially, as fluoro surfactant, of the product sold by 3M under the reference FC-4430.

The proportions of surfactants by mass relative to the total mass of the sol-gel solution represent, preferably in increasing order, 0.01% to 5%, 0.05% to 3%, 0.10% to 2.00%.

The hydrolysis and/or condensation catalysts are preferably chosen from acids and bases.

The acid catalysts may be chosen from organic acids and mineral acids, and mixtures thereof. The organic acids may be chosen especially from carboxylic acids such as aliphatic monocarboxylic acids, for instance acetic acid, polycarboxylic acids such as dicarboxylic acids and tricarboxylic acids, for example citric acid, and mixtures thereof. Among the mineral acids, use may be made of nitric acid or hydrochloric acid, and mixtures thereof.

Acetic acid has the additional advantage, when the composition comprises a metal oxide precursor, of acting as a stabilizer. Specifically, acetic acid chelates these precursors and thus prevents excessively rapid hydrolysis of this type of product.

The basic catalysts may be chosen from amine bases such as ethanolamine and triethylamine, and mixtures thereof. A particular base is used in the case where acids would be prohibited due to the nature of the substrate or of the silane used.

The solution may also comprise pigments, dyes or nacres. According to this embodiment, the sol-gel layers may have a colored appearance. Another alternative for obtaining this colored appearance consists in selecting to introduce into the matrix of colloidal particles colored metal oxides such as cobalt, vanadium, chromium, manganese, iron, nickel or copper oxide particles and oxide particles of any other transition metal or non-metal capable of giving said colored appearance.

The deposition may be performed according to one of the following techniques:
dip-coating;
spin-coating;
laminar-flow-coating or meniscus coating;
spray-coating;
soak-coating;
roll-processing;

paint-coating;
screen printing.

The deposition is preferably performed by spraying with pneumatic atomization.

The sol-gel layer fills the roughness of the central layer thus ensuring planarity of the surface of the layered element. The texture of the main outer surface of the central layer is formed by a plurality of designs that are hollowed or protruding relative to a general plane of the contact surface. The thickness defined between the lowest hollow and the highest peak or crest corresponds to the value known as the peak to valley value. The thickness of the sol-gel layer must be sufficient to render planar the surface of the central layer and must thus be at least equal to the peak to valley, value of the texture of the central layer. The thickness of the sol-gel layer is preferably greater than the peak to valley value of the central layer.

According to the invention, the thickness of the sol-gel layer is defined from the lowest hollow of the central layer. The thickness of the sol-gel layer may be between 5 nm and 100 μm and preferably between 50 nm and 50 μm. This thickness may be obtained as a single layer, by one or more application operations (or passes), via techniques such as dipping, sprinkling or spraying.

The drying temperature of the sol-gel film may range from 0 to 200° C., preferably from 100° C. to 150° C. and more preferably from 120° C. to 170° C.

Advantageously, the device of the invention makes it possible to obtain:
  variable light transmission as a function of the choice of the central layer and of the thickness of the lower outer layer,
  transmission haze measured according to standard ASTM D 1003 of less than 5%, preferably less than 2.5% and better still less than 1%,
  a lightness measured using a Haze-Gard Plus machine from BYK of greater than 93%, preferably greater than 95% and better still greater than 97%.

According to one aspect of the invention, the lower outer layer of the layered element consisting of dielectric materials is chosen from:
  transparent substrates, one of the main surfaces of which is textured and the other smooth, preferably chosen from polymers, glasses and ceramics,
  a layer of dielectric material chosen from the oxides, nitrides or halides of one or more transition metals, non-metals or alkaline-earth metals,
  a layer based on curable materials that are initially in a viscous, liquid or pasty state, suited to forming operations comprising:
    photocrosslinkable and/or photopolymerizable materials,
    layers deposited via a sol-gel process,
  inserts or sheets of thermoformable or pressure-sensitive plastic material which may preferably be based on polymers chosen from polyvinyl butyrals (PVB), polyvinyl chlorides (PVC), polyurethanes (PU), polyethylene terephthalates (PET) or ethylene-vinyl acetate (EVA) copolymers.

The texturing of one of the main surfaces of the transparent substrates may be obtained via any known texturing process, for example by embossing the surface of the substrate preheated to a temperature at which it is possible to deform it, in particular by lamination using a roller having at its surface texturing complementary to the texturing to be formed on the substrate; by abrasion using abrasive particles or surfaces, in particular by sanding; by chemical treatment, especially acid treatment in the case of a glass substrate; by molding; especially injection molding in the case of a substrate made of thermoplastic polymer; by etching.

When the transparent substrate is made of polymer, it may be rigid or flexible. Examples of polymers that are suitable according to the invention especially comprise:
  polyesters such as polyethylene terephthalate (PET), polybutylene terephthalate (PBT), polyethylene naphthalate (PEN);
  polyacrylates such as polymethyl methacrylate (PMMA);
  polycarbonates;
  polyurethanes;
  polyamides;
  polyimides;
  fluoroester polymers such as ethylene tetrafluoroethylene (ETFE), polyvinylidene fluoride (PVDF), polychlorotrifluoroethylene (PCTFE), ethylene chlorotrifluoroethylene (ECTFE) and fluorinated ethylene-propylene copolymers (FEP);
  photocrosslinked and/or photopolymerized resins, such as thiolene, polyurethane, urethane-acrylate or polyester-acrylate resins, and
  polythiourethanes.

These polymers generally have a refractive index range of from 1.30 to 1.70. However, it is advantageous to note that some of these polymers and especially the polymers comprising sulfur such as polythiourethanes may have high refractive indices that may be up to 1.74.

Examples of glass substrates that may be used directly as outer layer of the layered element comprise:
  the glass substrates sold by the company Saint-Gobain Glass in the range Satinovo®, which are already textured and have on one of their main surfaces a texture obtained by sanding or acid attack;
  the glass substrates sold by the company Saint-Gobain Glass in the range Albarino® S, P or G or in the range Masterglass®, which have on one of their main surfaces a texture obtained by lamination,
  high-index glass substrates textured by sanding such as flint glass, sold, for example, by the company Schott under the references SF6 (n=1.81), 7SF57 (n=1.85), N-SF66 (n=1.92) and P-SF68 (n=2.00).

The layers of dielectric material chosen from the oxides, nitrides or halides of one or more transition metals, non-metals or alkaline-earth metals may be deposited by magnetron sputtering and then textured by abrasion using abrasive particles or surfaces, in particular by sanding; by chemical treatment or by etching.

The lower outer layer of the layered element may also be based on curable materials that are initially in a viscous, liquid or pasty state adapted to forming operations.

The layer initially deposited in a viscous, liquid or pasty state may be a layer of photocrosslinkable and/or photopolymerizable material. Preferably, this photocrosslinkable and/or photopolymerizable material is in liquid form at room temperature and gives, when it is irradiated and photocrosslinked and/or photopolymerized, a transparent solid free of bubbles or of any other irregularity. It may in particular be a resin such as those usually used as adhesives, bonding agents or surface coatings. These resins are generally based on monomers/comonomers/prepolymers of epoxy, epoxy silane, acrylate, methacrylate, acrylic acid or methacrylic acid type. Examples that may be mentioned include thiolene, polyurethane, urethane-acrylate or polyester-acrylate resins. Instead of a resin, it may be a photocrosslinkable aqueous gel, such as a polyacrylamide gel. Examples of photocrosslinkable and/or photopolymerizable resins that may be used in the present invention comprise UV-curable resins such as the product KZ6661 sold by the company JSR Corporation.

As a variant, the outer layer initially deposited in a viscous, liquid or pasty state may be a layer deposited via a sol-gel process.

Texturing of the lower outer layer based on curable materials that are initially in a viscous, liquid or pasty state may be performed using a roller having at its surface texturing complementary to that to be formed on the main outer surface of said layer.

The lower outer layer may comprise a layer based on an insert or sheet of thermoformable or pressure-sensitive plastic material textured by compression and/or heating. This layer based on polymer material may in particular be a layer based on polyvinyl butyral (PVB), ethylene-vinyl acetate (EVA), polyurethane (PU), polyethylene terephthalate (PET) or polyvinyl chloride (PVC). The index of the standard lamination inserts (PVB, EVA, PU, SentryGlas®) is a maximum of about 1.491 at 589 nm.

The thickness of the lower outer layer is preferably between 1 μm and 6 mm and varies according to the choice of the dielectric material.

The flat or textured glass substrates preferably have a thickness of between 0.4 and 6 mm and preferably between 0.7 and 2 mm.

The flat or textured polymer substrates preferably have a thickness of between 0.020 and 2 mm and preferably between 0.025 and 0.25 mm.

The outer layers consisting of a layer of dielectric material preferably have a thickness of between 0.2 and 20 μm and preferably between 0.5 and 2 μm.

The layers based on curable materials that are initially in a viscous, liquid or pasty state which are adapted to forming operations preferably have a thickness of between 0.5 and 100 μm, preferably between 0.5 and 40 μm and better still between 0.5 and 15 μm. The layers based on photocrosslinkable and/or photopolymerizable materials preferably have a thickness of between 0.5 and 20 μm and preferably between 0.7 and 10 μm. The layers deposited via a sol-gel process preferably have a thickness of between 0.5 and 50 μm and preferably between 10 and 15 μm.

The layers based on an insert or sheet made of plastic preferably have a thickness of between 10 μm and 1 mm and preferably between 0.3 and 1 mm.

The dielectric materials or layer may have:
- a refractive index of between 1.51 and 1.53, for example in the case of using a standard glass,
- a refractive index of less than 1.51 and preferably less than 1.49, in the case of using a dielectric material or layer with a low refractive index,
- a refractive index of greater than 1.54 and preferably greater than 1.7, in the case of using a dielectric material or layer with a high refractive index.

The layer or stack of layers of the central layer of the layered element may comprise:
- at least one thin layer consisting of a dielectric material chosen from the oxides, nitrides or halides of one or more transition metals, non-metals or alkaline-earth metals,
- at least one thin metal layer, especially a thin layer of silver, gold, copper, titanium, niobium, silicon, aluminum, nickel-chromium (NiCr) alloy, stainless steel, or alloys thereof.

The thin layer consisting of a dielectric material may be chosen from:
- at least one thin layer consisting of a dielectric material with a high refractive index, different from the refractive index of the outer layers, such as $Si_3N_4$, AlN, NbN, $SnO_2$, ZnO, SnZnO, $Al_2O_3$, $MoO_3$, NbO, $TiO_2$, $ZrO_2$,
- at least one thin layer consisting of a dielectric material with a low refractive index, different from the refractive index of the outer layers, such as $SiO_2$, $MgF_2$, $AlF_3$.

The choice of the thickness of the central layer depends on a certain number of parameters. In general, it is considered that the total thickness of the central layer is between 5 and 200 nm and the thickness of a layer of the central layer is between 1 and 200 nm.

When the central layer is a metallic layer, the thickness of a layer is preferably between 5 and 40 nm, better still between 6 and 30 nm and even better still from 6 to 20 nm.

When the central layer is a dielectric layer, for example of $TiO_2$, it preferably has a thickness of between 20 and 100 nm and better still of 55 and 65 nm and/or a refractive index of between 2.2 and 2.4.

Advantageously, the composition of the central layer of the layered element may be adjusted to give additional properties to the layered element, for example thermal properties, of solar control type. Thus, in one embodiment, the central layer of the layered element is a transparent stack of thin layers comprising an alternation of "n" functional metallic layers, especially of functional layers based on silver or on a metal alloy containing silver, and of "(n+1)" anti-reflection coatings, with n≥1, in which each functional metallic layer is positioned between two anti-reflection coatings.

In a known manner, such a stack with a functional metallic layer has reflection properties in the solar radiation region and/or in the infrared radiation region of long wavelength. In such a stack, the functional metallic layers essentially determine the thermal performance qualities, whereas the anti-reflection coatings which surround them act on the optical aspect in an interferential manner. Specifically, although the functional metallic layers make it possible to obtain desired thermal performance qualities even at a low geometrical thickness, of the order of 10 nm for each functional metallic layer, they strongly oppose, however, the passage of radiation in the visible wavelength range. Consequently, anti-reflection coatings on either side of each functional metallic layer are necessary in order to ensure good light transmission in the visible range.

The layered element obtained then combines optical properties, namely properties of specular transmission and of diffuse reflection of incident radiation on the layered element, and thermal properties, namely solar control properties. Such layered element may be used for solar protection glazings and/or heat insulating glazings of buildings or vehicles.

According to one aspect of the invention, the texture of each contact surface between two adjacent layers of the layered element, one of which is a dielectric and the other metallic or both of which are dielectric layers with different refractive indices, is formed by a plurality of designs that are hollowed or protruding relative to a general plane of the contact surface. Preferably, the mean height of the designs of each contact surface between two adjacent layers of the layered element, one of which is a dielectric and the other metallic, or which are both dielectric layers with different refractive indices, is between 1 micrometer and 100 μm. For the purposes of the invention, the mean height of the designs of the contact surface is defined as the arithmetic mean of the distances $y_i$ as an absolute value taken between the peak and the general plane of the contact surface for each design of the contact surface, equal to $$\frac{1}{n}\sum_{i=1}^{n}|y_i|.$$

The designs of the texture of each contact surface between two adjacent layers of the layered element, one of which is a dielectric and the other metallic, or which are both dielectric layers with different refractive indices, may be distributed randomly on the contact surface. As a variant, the designs of the texture of each contact surface between two adjacent layers of the layered element, one of which is a dielectric and the other metallic, or which are both dielectric layers with different refractive indices, may be distributed periodically on the contact surface. These designs may especially be cones, pyramids, grooves, channels or wavelets.

According to one aspect of the invention, for each layer of the central layer which is surrounded by layers of dielectric or metallic nature, different from its own or having refractive indices different from its own, the thickness of this layer, taken perpendicular to its contact surfaces with the adjacent layers, is low relative to the mean height of the designs of each of its contact surfaces with the adjacent layers. Such a low thickness makes it possible to increase the probability that the entry interface of radiation into this layer and the exit interface of the radiation out of this layer are parallel, and thus to increase the percentage of specular transmission of the radiation through the layered element. Advantageously, the thickness of each layer of the central layer that is intercalated between two layers of dielectric or metallic nature, different from its own or with refractive indices different from its own, in which this thickness is taken perpendicular to its contact surfaces with the adjacent layers, is less than ¼ of the mean height of the designs of each of its contact surfaces with the adjacent layers.

Advantageously, the layered element comprises, on at least one of its main outer smooth surfaces, an anti-reflection coating at the interface between the air and the constituent material of the outer layer forming this main outer surface. By virtue of the presence of this anti-reflection coating, incident radiation on the layered element on the side of this main outer surface is preferably reflected at each textured contact surface rather than on the smooth outer surface of the layered element, which corresponds to a mode of diffuse reflection rather than to a mode of specular reflection. Diffuse reflection of the radiation by the layered element is thus promoted relative to specular reflection.

The anti-reflection coating provided on at least one of the main outer surfaces of the layered element may be of any type that makes it possible to reduce the radiation reflection at the interface between the air and the corresponding outer layer of the layered element. It may especially be a layer with a refractive index between the refractive index of air and the refractive index of the outer layer, such as a layer deposited on the surface of the outer layer via a vacuum technique or a porous layer of sol-gel type, or alternatively, in the case where the outer layer is made of glass, a hollowed surface part of the outer glass layer obtained by treatment with acid of "etching" type. As a variant, the anti-reflection coating may be formed by a stack of thin layers having alternately smaller and then larger refractive indices acting as an interference filter at the interface between the air and the outer layer, or by a stack of thin layers having a continuous or graduated gradient of refractive indices between the refractive index of air and that of the outer layer.

The central layer is formed either by a single layer deposited in compliant manner onto the textured main surface of the first outer layer, or by a stack of layers, successively deposited in compliant manner onto the textured main surface of the first outer layer.

According to the invention, it is considered that the central layer is deposited in compliant manner onto the textured main surface of the first outer layer if, following the deposition, the upper surface of the central layer is textured and parallel to the textured contact surface of the first outer layer. The deposition of the central layer in compliant manner, or of the layers of the central layer successively in compliant manner, onto the main textured surface of the first outer layer is preferably performed by cathodic sputtering, especially magnetic field-assisted sputtering.

The additional layers are preferably chosen from:
transparent substrates chosen from the polymers, glasses or ceramics as defined above but comprising two main smooth surfaces,
curable materials that are initially in a viscous, liquid or pasty state suited to forming operations as described above,
inserts or sheets made of thermoformable or pressure-sensitive plastic material as described above.

The main outer surface of the sol-gel layer may have certain large-scale surface irregularities. To re-establish the smooth nature of the outer layer of the layered element, it is thus possible to place in contact with this surface bearing certain irregularities an additional layer that has substantially the same refractive index as said outer layer, such as a sheet of plastic material described above.

Advantageously, the main outer smooth surfaces of the layered element and/or the main outer smooth surfaces of the glazing are flat or bent, preferably, these main outer smooth surfaces are parallel to each other. This contributes toward limiting the light dispersion for radiation passing through the layered element, and thus to improving the clearness of vision through the layered element.

The layered element may be a rigid glazing or a flexible film. Such a flexible film is advantageously equipped, on one of its main outer surfaces, with an adhesive layer covered with a protective strip intended to be removed for bonding the film. The layered element in the form of a flexible film is then capable of being applied by bonding to an existing surface, for example a surface of a glazing, so as to give this surface diffuse reflection properties, while at the same time maintaining specular transmission properties.

In one embodiment of the invention, the lower outer layer is a transparent substrate. The central layer is formed either by a single layer deposited in compliant manner onto the textured main surface of the first outer layer, or by a stack of layers, successively deposited in compliant manner onto the textured main surface of the first outer layer. Preferably, the central layer is deposited by cathodic sputtering, especially magnetic field-assisted sputtering. The second outer layer or upper outer layer comprises the layer of sol-gel, deposited on the textured main surface of the central layer opposite the first outer layer.

According to another aspect of the invention, an additional upper layer may be used as counter-substrate. The sol-gel layer then provides integral connection between the lower outer layer equipped with the central layer and the counter-substrate.

According to another aspect of the invention, when the lower outer layer or an additional layer comprises a layer based on an insert or sheet made of thermoformable or pressure-sensitive plastic material, an additional layer, for example a transparent substrate with a refractive index substantially equal to those of the outer layers may be used. The layer based on an insert or sheet made of plastic material then corresponds to a lamination insert providing the connection between the lower outer layer of the layered element coated with the central layer and the additional layer.

The transparent layered element of the invention preferably comprises the following stack:
  optionally at least one additional lower layer chosen from transparent substrates, of which both the main surfaces are smooth, such as polymers and glasses and inserts made of thermoformable or pressure-sensitive plastic material,
  a lower outer layer chosen from transparent substrates such as polymers and glasses and curable materials that are initially in a viscous, liquid or pasty state adapted to forming operations,
  a central layer comprising a thin layer consisting of a dielectric material or a thin metallic layer,
  an upper outer layer chosen from the sol-gel layers,
  optionally at least one additional upper layer chosen from transparent substrates, of which both the main surfaces are smooth and chosen from polymers and glasses and inserts made of thermoformable or pressure-sensitive plastic material.

In one variant of the invention, the layered element comprises:
  a lower outer layer chosen from transparent substrates made of rough glass,
  a central layer,
  an upper outer layer chosen from the sol-gel layers,
  an additional upper layer chosen from transparent substrates made of flat glass.

According to another embodiment, the layered element of the invention comprises the following stack:
  a lower outer layer chosen from transparent substrates made of rough glass,
  a central layer,
  an upper outer layer chosen from the sol-gel layers,
  optionally an additional upper layer chosen from inserts made of thermoformable or pressure-sensitive material, on which is preferentially superposed another additional upper layer chosen from transparent glass substrates.

Another subject of the invention is a process for manufacturing layered element as described previously, comprising the following steps:
  a transparent substrate, one of the main surfaces of which is textured and the other main surface is smooth, is provided as first outer layer or lower outer layer;
  a central layer is deposited on the main textured surface of the lower outer layer, i.e. when the central layer is formed by a single layer, which is a dielectric layer with a refractive index different from that of the lower outer layer or a metallic layer, by depositing the central layer in compliant manner onto said main textured surface, or when the central layer is formed by a stack of layers comprising at least one dielectric layer with a refractive index different from that of the lower outer layer or a metallic layer, by depositing the layers of the central layer successively in compliant manner onto said main textured surface;
  the upper outer sol-gel layer is formed on the main textured surface of the central layer opposite the lower outer layer, where the lower and upper outer layers consist of dielectric materials having substantially the same refractive index, by deposition via a sol-gel process,
  optionally at least one upper and/or lower additional layer is formed on the main outer smooth surface(s) of the layered element.

A subject of the invention is also a building facade, especially an airport terminal facade, comprising at least one layered element as described previously.

Another subject of the invention is a display or projection screen comprising layered element as described previously. In particular, a subject of the invention is a glazing of a head-up display system comprising layered element as described previously.

Finally, a subject of the invention is the use of layered element as described previously as all or part of a glazing for a vehicle, building, street furniture, interior furniture, display or projection screen, or head-up display system. The layered element according to the invention may, for example, be integrated into a display window thus allowing an image to be projected onto said layered element.

The characteristics and advantages of the invention will emerge in the description that follows of several embodiments of layered element, given solely as an example and made with reference to the attached drawings in which.

Figure 1:
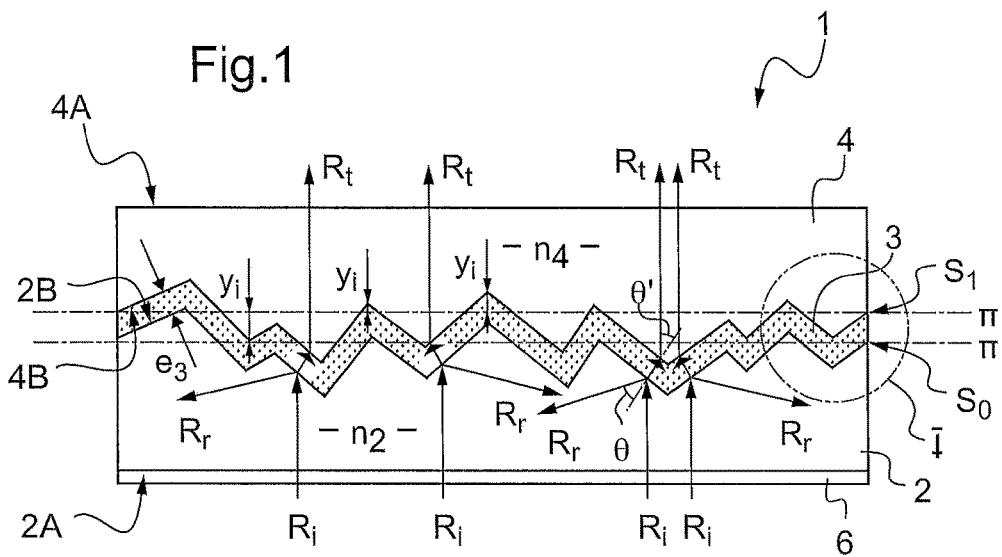
FIG. 1 is a schematic cross section of layered element according to the invention.
Figure 3:
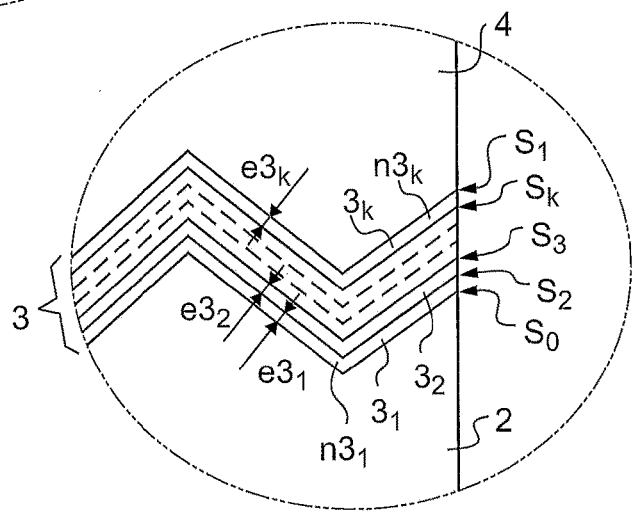
Figure 4:
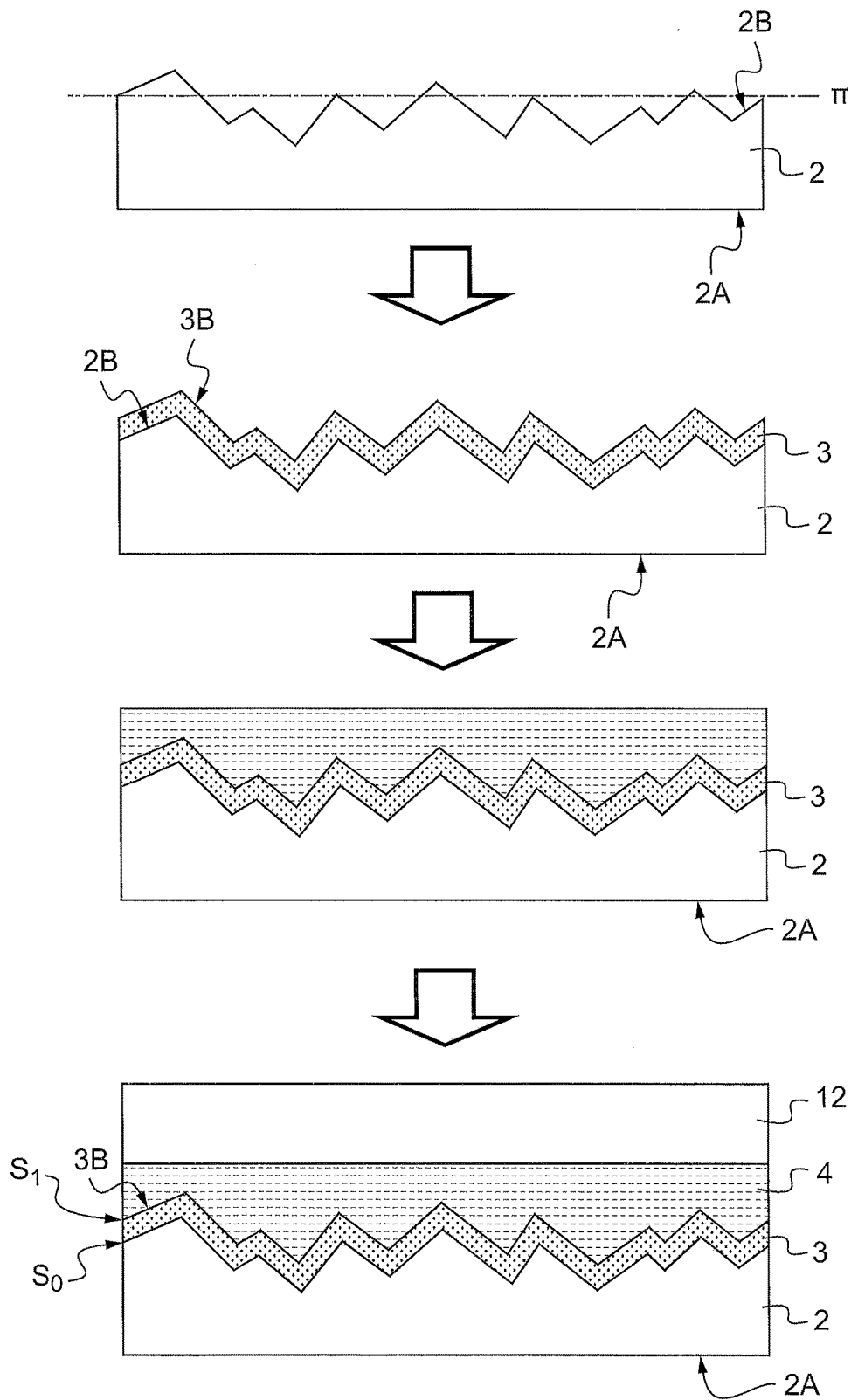
Figure 5:
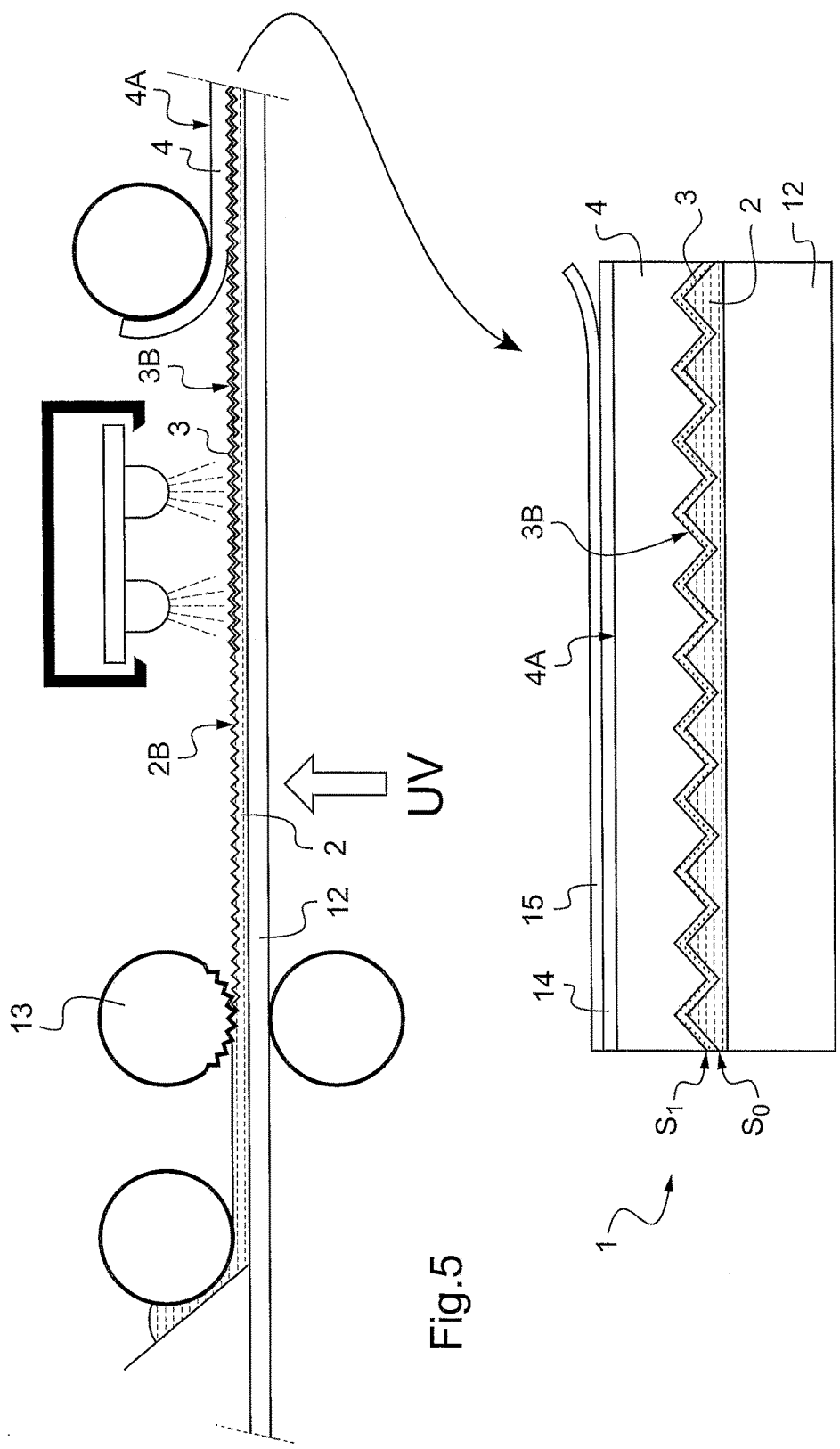
Figure 6:
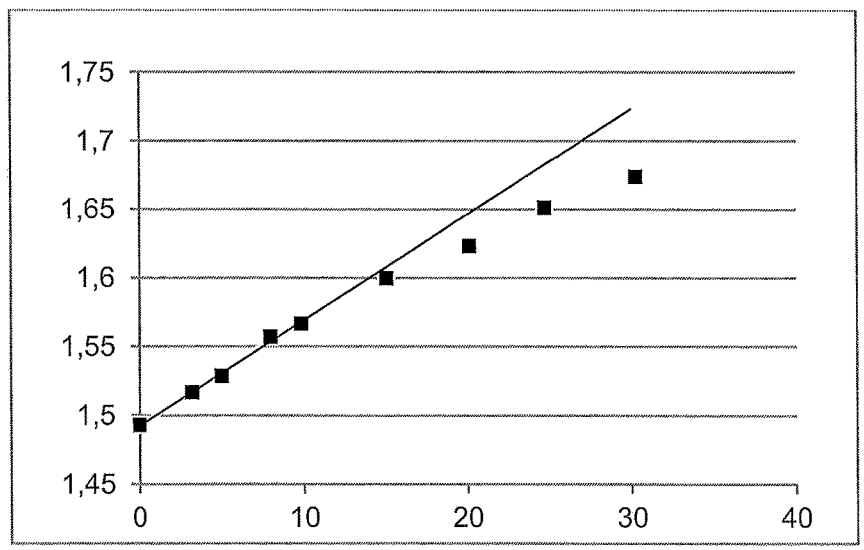
Figure 7:
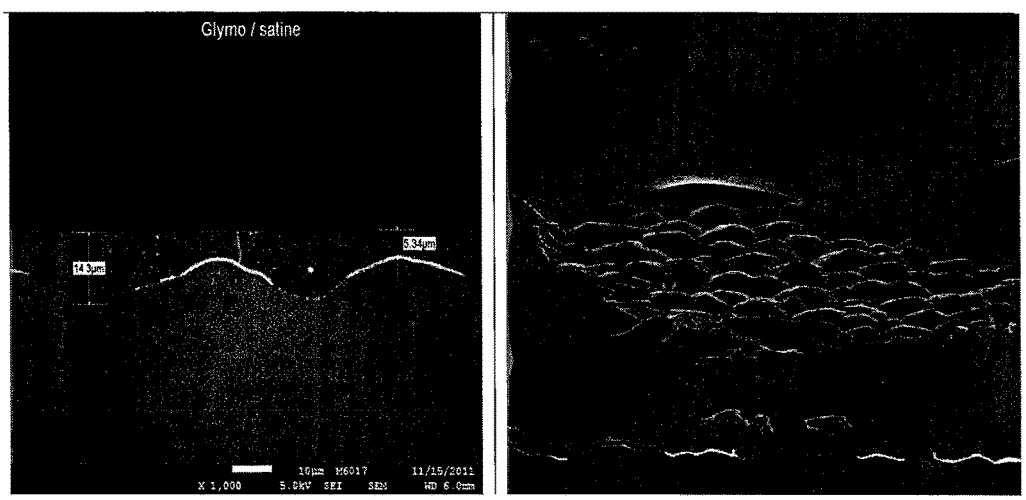
Figure 8:
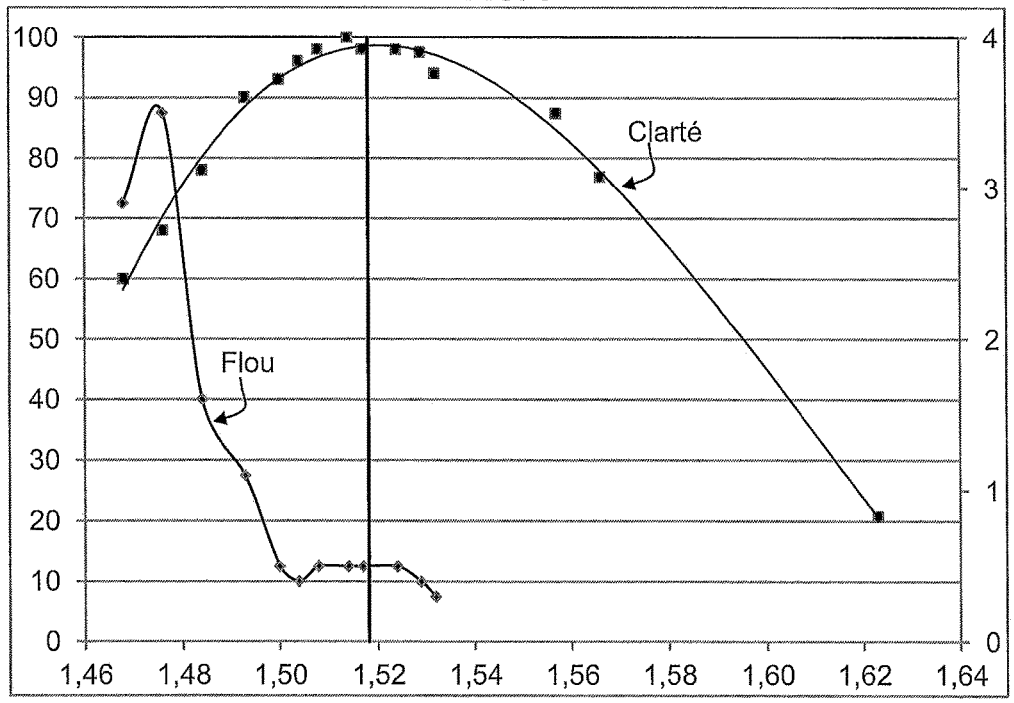
Figure 9:
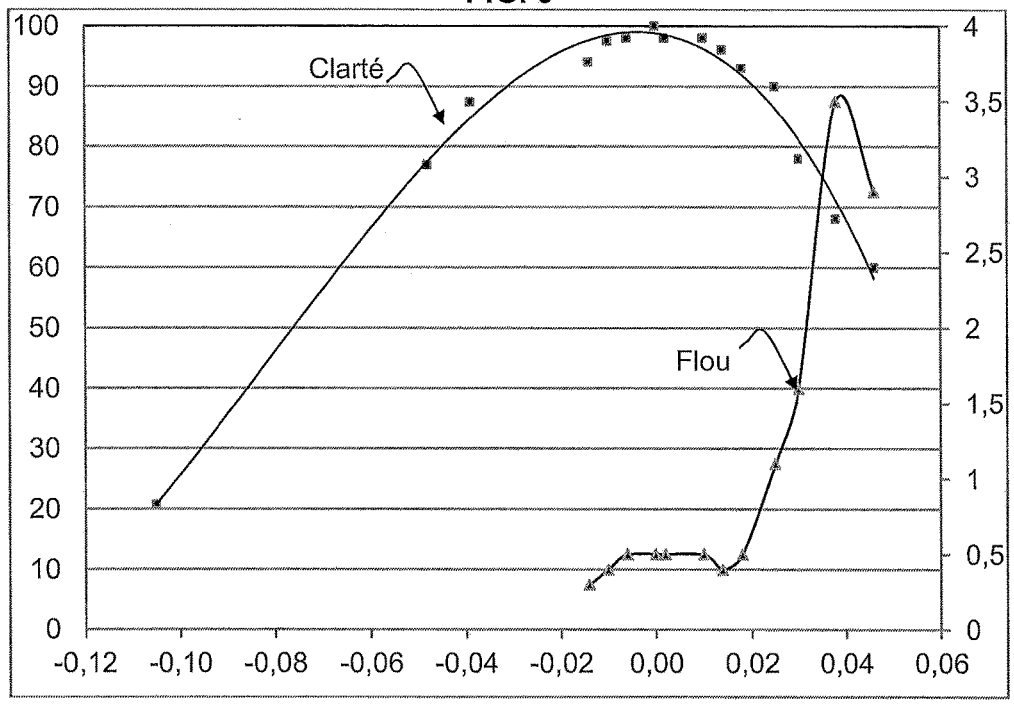

FIG. 3 is a view on a larger scale of the detail I of FIG. 1 for a second variant of the layered element; and FIGS. 4 and 5 represent schemes showing the steps of a process for manufacturing the layered element according to the invention, FIG. 6 represents the change in refractive index as a function of the volume proportions of $TiO_2$ in a sol-gel layer, FIG. 7 shows images taken with a scanning electron microscope of satin-finish substrates made of Satinovo® transparent rough glass onto which a sol-gel layer has been deposited via the sol-gel process, FIGS. 8 and 9 are graphs showing the change in haze (right-hand y-axis) and in lightness (left-hand y-axis) as a function of the refractive index of the sol-gel layer and of the variation in refractive index between a Satinovo® substrate used as lower outer layer and the sol-gel layer.

For the clarity of the drawing, the relative thicknesses of the various layers in the figures have not been rigorously respected. Furthermore, the possible variation in thickness of the or each constituent layer of the central layer as a function of the slope of the texture has not been shown in the figures, given that this possible thickness variation has no impact on the parallelism of the textured contact surfaces. Specifically, for each given slope of the texture, the textured contact surfaces are parallel with each other.

The layered element 1 illustrated in FIG. 1 comprises two outer layers 2 and 4, which consist of transparent dielectric materials having substantially the same refractive index n2, n4. Each outer layer 2 or 4 has a smooth main surface, 2A or 4A, respectively, directed toward the exterior of the layered element, and a textured main surface, 2B or 4B, respectively, directed toward the interior of the layered element.

The smooth outer surfaces 2A and 4A of the layered element 1 allow specular transmission of radiation at each surface 2A and 4A, i.e. the entry of radiation into an outer layer or the exit of radiation from an outer layer without modification of the direction of the radiation.

The textures of the inner surfaces 2B and 4B are complementary to each other. As is clearly visible in FIG. 1, the textured surfaces 2B and 4B are positioned facing each other, in a configuration in which their textures are strictly parallel to each other. The layered element 1 also comprises a central layer 3, intercalated in contact between the textured surfaces 2B and 4B.

Figure 2:
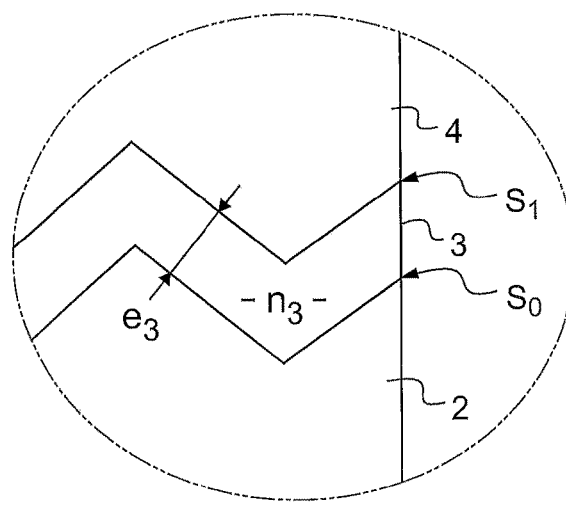
FIG. 2 is a view on a larger scale of the detail I of FIG. 1 for a first variant of the layered element.

In the variant shown in FIG. 2, the central layer 3 is a monolayer and consists of a transparent material that is either metallic or dielectric with a refractive index n3 different from that of the outer layers 2 and 4.

In the variant shown in FIG. 3, the central layer 3 is formed by a transparent stack of several layers $3_1, 3_2, \ldots, 3_k$, in which at least one of the layers $3_1$ to $3_k$ is either a metallic layer or a dielectric layer with a refractive index different from that of the outer layers 2 and 4. Preferably, at least each of the two layers $3_1$ and $3_k$ located at the ends of the stack is a metallic layer or a dielectric layer with a refractive index $n3_1$ or $n3_k$ different from that of the outer layers 2 and 4.

In FIGS. 2 and 3, $S_0$ denotes the contact surface between the outer layer 2 and the central layer 3, and $S_1$ denotes the contact surface between the central layer 3 and the outer layer 4. Furthermore, in FIG. 3, $S_2$ to $S_k$ successively denote the inner contact surfaces of the central layer 3, starting from the contact surface closest to the surface $S_0$.

In the variant of FIG. 2, due to the arrangement of the central layer 3 in contact between the textured surfaces 2B and 4B which are parallel to each other, the contact surface $S_0$ between the outer layer 2 and the central layer 3 is textured and parallel to the contact surface $S_1$ between the central layer 3 and the outer layer 4. In other words, the central layer 3 is a textured layer having over its entire area a uniform thickness e3, taken perpendicular to the contact surfaces $S_0$ and $S_1$.

In the variant of FIG. 3, each contact surface $S_2, \ldots, S_k$ between two adjacent layers of the constituent stack of the central layer 3 is textured and strictly parallel to the contact surfaces $S_0$ and $S_1$ between the outer layers 2, 4 and the central layer 3. Thus, all the contact surfaces $S_0, S_1, \ldots, S_k$ between adjacent layers of the element 1 which are either of different dielectric or metallic nature, or dielectric with different refractive indices, are textured and parallel to each other. In particular, each layer $3_1, 3_2, \ldots, 3_k$ of the constituent stack of the central layer 3 has a uniform thickness $e3_1, e3_2, \ldots, e3_k$, taken perpendicular to the contact surfaces $S_0, S_1, \ldots S_k$.

As shown in FIG. 1, the texture of each contact surface $S_0, S_1$ or $S_0, S_1, \ldots, S_k$ of the layered element 1 is formed by a plurality of designs that are hollowed or protruding relative to a general plane π of the contact surface. Preferably, the mean height of the designs of each textured contact surface $S_0, S_1$ or $S_0, S_1, \ldots, S_k$ is between 1 micrometer and 100 μm. The mean height of the designs of each textured contact surface is defined as the arithmetic mean $$\frac{1}{n}\sum_{i=1}^{n}|y_i|,$$

with $y_i$ being the distance taken between the peak and the plane π for each design of the surface, as shown schematically in FIG. 1.

According to one aspect of the invention, the thickness e3 or $e3_1, e3_2, \ldots, e3_k$ of the or each constituent layer of the central layer 3 is less than the mean height of the designs of each textured contact surface $S_0, S_1$ or $S_0, S_1, \ldots, S_k$ of the layered element 1. This condition is important for increasing the probability that the inlet interface of radiation into the layer of the central layer 3 and the outlet interface of radiation out of this layer are parallel, and thus for increasing the percentage of specular transmission of the radiation through the layered element 1. For the sake of visibility of the various layers, this condition has not been strictly respected in the figures.

Preferably, the thickness e3 or $e3_1, e3_2, \ldots, e3_k$ of the or each constituent layer of the central layer 3 is less than ¼ of the mean height of the designs of each textured contact surface of the layered element. In practice, when the central layer 3 is a thin layer or a stack of thin layers, the thickness e3 or $e3_1, e3_2, \ldots, e3_k$ of each layer of the central layer 3 is of the order of or less than ¹⁄₁₀ of the mean height of the designs of each textured contact surface of the layered element.

FIG. 1 illustrates the path of radiation, which is incident on the layered element 1 on the side of the outer layer 2. The incident beams $R_i$ arrive on the outer layer 2 with a given incident angle θ. As shown in FIG. 1, the incident beams $R_i$, when they reach the contact surface $S_0$ between the outer layer 2 and the central layer 3, are reflected either by the metallic surface or by the difference in refractive index at this contact surface between, respectively, the outer layer 2 and the central layer 3 in the variant of FIG. 2 and between the outer layer 2 and the layer $3_1$ in the variant of FIG. 3. As the contact surface $S_0$ is textured, reflection takes place in a plurality of directions $R_r$. The reflection of the radiation by the layered element 1 is thus diffuse.

Part of the incident radiation is also refracted in the central layer 3. In the variant of FIG. 2, the contact surfaces $S_0$ and $S_1$ are parallel to each other, which implies according to the Snell-Descartes law that $n2 \cdot \sin(\theta) = n4 \cdot \sin(\theta')$, where θ is the incident angle of the radiation on the central layer 3 from the outer layer 2 and θ' is the refraction angle of the radiation in the outer layer 4 from the central layer 3. In the variant of FIG. 3, as the contact surfaces $S_0, S_1, \ldots, S_k$ are all parallel to each other, the relationship $n2 \cdot \sin(\theta) = n4 \cdot \sin(\theta')$ derived from the Snell-Descartes law remains verified. Consequently, in the two variants, since the refractive indices n2 and n4 of the two outer layers are substantially equal to each other, the beams $R_t$ transmitted by the layered element are transmitted with a transmission angle θ' equal to their incident angle θ on the layered element. The transmission of the radiation by the layered element 1 is thus specular.

Similarly, in the two variants, incident radiation on the layered element 1 on the side of the outer layer 4 is reflected in a diffuse manner and transmitted in a specular manner by the layered element, for the same reasons as previously.

Advantageously, the layered element 1 comprises an anti-reflection coating 6 on at least one of its smooth outer surfaces 2A and 4A. Preferably, an anti-reflection coating 6 is provided on each main outer surface of the layered element that is intended to receive radiation. In the example of FIG. 1, only the surface 2A of the outer layer 2 is equipped with an anti-reflection coating 6, since it is the surface of the layered element that is directed on the radiation incident side.

As mentioned previously, the anti-reflection coating 6, provided on the smooth surface 2A and/or 4A of the outer layer 2 or 4 may be of any type that makes it possible to reduce the radiation reflection at the interface between the air and the outer layer. It may especially be a layer with a refractive index between the refractive index of air and the refractive index of the outer layer, a stack of thin layers acting as an interference filter, or a stack of thin layers having a gradient of refractive indices.

An example of a process for manufacturing the glazing of the invention is described below in reference to FIG. 4. According to this process, the central layer 3 is deposited in a compliant manner on a textured surface 2B of a rigid or flexible transparent substrate, forming the outer layer 2 of the layered element 1. The main surface 2A of this substrate opposite the textured surface 2B is smooth. This substrate 2 may especially be a textured glass substrate of the type such as Satinovo®, Albarino® or Masterglass®. As a variant, the substrate 2 may be a substrate based on rigid or flexible polymer material, for example of the type such as polymethyl methacrylate or polycarbonate.

The compliant deposition of the central layer 3, whether it is a monolayer or formed by a stack of several layers, is preferably especially prepared under vacuum, by magnetic field-assisted cathodic sputtering (known as "cathodic magnetron" sputtering). This technique makes it possible to deposit, on the textured surface 2B of the substrate 2, either the single layer in compliant manner, or the various layers of the stack successively in compliant manner. They may in particular be thin dielectric layers, especially layers of $Si_3N_4$, $SnO_2$, $ZnO$, $ZrO_2$, $SnZnO_x$, AlN, NbO, NbN, $TiO_2$, $SiO_2$, $Al_2O_3$, $MgF_2$, $AlF_3$, or thin metallic layers, especially silver, gold, titanium, niobium, silicon, aluminum, nickel-chromium (NiCr) alloy layers, or layers of alloys or these metals.

In the process of FIG. 4, the second outer layer 4 of the layered element 1 may be formed by covering the central layer 3 with a transparent sol-gel layer with a refractive index substantially equal to that of the substrate 2. This layer, in the viscous, liquid or pasty state, embraces the texture of the surface 3B of the central layer 3 opposite the substrate 2. Thus, it is ensured that, in the cured state of the layer 4, the contact surface $S_1$ between the central layer 3 and the outer layer 4 is indeed textured and parallel to the contact surface $S_0$ between the central layer 3 and the outer layer 2.

The outer layer 4 of the layered element 1 of FIG. 4 is a sol-gel layer, deposited via a sol-gel process on the textured surface of the central layer 3.

Finally, one or more additional layers 12 may be formed over the layered element. In this case, the additional layer(s) are preferably a flat glass substrate, a plastic insert or a superposition of an insert and of a flat glass substrate.

According to one embodiment of the invention, it may be advantageous to form on the sol-gel layer forming the outer layer of the layered element an additional layer 12 by positioning a PVB or EVA lamination insert against the main smooth outer surface of the layered element. The additional layer 12 preferentially has in this case substantially the same refractive index as the outer layer of the layered element obtained from a sol-gel process.

The additional layer may also be a transparent substrate, for example a flat glass. In this case, the additional layer is used as a counter-substrate. The sol-gel layer then ensures integral connection between the lower outer layer equipped with the central layer and the counter-substrate.

The use of a transparent substrate as additional upper layer is particularly useful when the additional layer directly below said additional upper layer is formed by a polymeric lamination insert.

A first additional layer 12 formed by a PVB or EVA lamination insert may be positioned against the outer upper surface of the layered element and a second additional layer 12 consisting of a flat glass substrate may be mounted on the insert.

In this configuration, the additional layers are combined with the layered element, via a standard lamination process. In this process, the polymeric lamination insert and the substrate are successively positioned, starting from the main upper outer surface of the layered element, and compression and/or heating is then applied to the laminated structure thus formed, at least to the glass transition temperature of the polymeric lamination insert, for example in a press or an oven.

During this lamination process, when the insert forms the additional upper layer located directly above the layered element whose upper layer is a sol-gel layer, it conforms both with the upper surface of the sol-gel layer and with the lower surface of the flat glass substrate.

In the process illustrated in FIG. 5, the layered element 1 is a flexible film with a total thickness of about 200-300 µm. The layered element is formed by the superposition:
- of an additional lower layer 12 formed by a polymeric flexible film,
- of an outer layer 2 made of a material that is photocrosslinkable and/or photopolymerizable under the action of UV radiation, applied against one of the main smooth surfaces of the flexible film,
- of a central layer 3,
- of a sol-gel layer having a thickness from 50 nm to 50 µm so as to form the second outer layer 4 of the layered element 1.

The flexible film forming the additional lower layer may be a film of polyethylene terephthalate (PET) with a thickness of 100 µm, and the outer layer 2 may be a layer of UV-curable resin of the type such as KZ6661 sold by the company JSR Corporation with a thickness of about 10 µm. The flexible film and the layer 2 both have substantially the same refractive index, of about 1.65 at 589 nm. In the cured state, the layer of resin shows good adhesion with PET.

The layer of resin 2 is applied to the flexible film with a viscosity allowing the insertion of texturing onto its surface 2B opposite the film 12. As illustrated in FIG. 5, the texturing of the surface 2B may be performed using a roller 13 having on its surface texturing complementary to that to be formed on the layer 2. Once the texturing has been formed, the superposed flexible film and layer of resin 2 are irradiated with UV radiation, as shown by the arrow in FIG. 5, which allows solidification of the layer of resin 2 with its texturing and assembly between the flexible film and the layer of resin 2.

The central layer 3 with a refractive index different from that of the outer layer 2 is then deposited in a compliant manner onto the textured surface 2B, by magnetron cathodic sputtering. This central layer may be a monolayer or formed by a stack of layers, as described previously. It may be, for example:
- a layer of $TiO_2$ having a thickness of between 55 and 65 nm, i.e. about 60 nm and a refractive index of 2.45 at 550 nm,
- a stack of layers comprising at least one silver-based layer as described in patent applications WO 02/48065 and EP 0 847 965.

The sol-gel layer is then deposited on the central layer 3 so as to form the second outer layer 4 of the layered element 1. This second outer layer 4 embraces the textured surface 3B of the central layer 3 opposite the outer layer 2.

An adhesive layer 14, covered with a protective strip (liner) 15 intended to be removed for bonding, may be applied to the outer surface 4A of the layer 4 of the layered element 1. The layered element 1 is thus in the form of a flexible film ready to be applied by bonding onto a surface, such as a surface of a glazing, so as to give this surface diffuse reflection properties. In the example of FIG. 5, the adhesive layer 14 and the protective strip 15 are applied to the outer surface 4A of the layer 4. The outer surface 2A of the layer 2, which is intended to receive incident radiation, is itself equipped with an anti-reflection coating.

In a particularly advantageous manner, as suggested in FIG. 5, the various steps of the process may be performed continuously on the same manufacturing line.

The insertion of the anti-reflection coating(s) of the layered element 1 has not been shown in FIGS. 4 to 5. It should be noted that, in each of the processes illustrated in these figures, the anti-reflection coating(s) may be inserted on the smooth surfaces 2A and/or 4A of the outer layers before or after assembling the layered element, without preference.

The invention is not limited to the examples described and represented. In particular, when the layered element is a flexible film as in the example of FIG. 5, the thickness of each outer layer formed based on a polymer film, for example based on a PET film, may be greater than 10 µm, especially from about 10 µm to 1 mm.

Furthermore, the texturing of the first outer layer 2 in the example of FIG. 5 may be obtained without making use of a layer of curable resin deposited on the polymer film, but directly by hot embossing of a polymer film, especially by lamination using a textured roller or by pressing using a punch.

Similar architectures may also be envisaged for plastic substrates instead of glass substrates.

The glazing according to the invention may be used for all known applications of glazings, such as for vehicles, buildings, street furniture, interior furniture, lighting, display screens, etc. It may also be a flexible film based on polymer material, which is especially able to be applied to a surface so as to give it diffuse reflection properties while at the same time preserving its transmission properties.

The layered element with strong diffuse reflection of the invention may be used in a head-up display (HUD) system. In a known manner, HUD systems, which are useful especially in aircraft cockpits and trains, but also nowadays in private motor vehicles (cars, trucks, etc.), make it possible to display information projected onto a glazing, in general the windshield of the vehicle, which is reflected to the conductor or the observer. These systems make it possible to inform the conductor of the vehicle without him having to move his regard from the front field of vision of the vehicle, which greatly enhance safety. The conductor sees a virtual image located a certain distance behind the glazing.

According to one aspect of the invention, the layered element is integrated into an HUD system as glazing, onto which is projected information. According to another aspect of the invention, the layered element is a flexible film applied to a main surface of glazing of an HUD system, especially a windshield, the information being projected onto the glazing on the flexible film side. In both these cases, strong diffuse reflection takes place on the first textured contact surface encountered by the radiation in the layered element, which allows good visualization of the virtual image, whereas the specular transmission through the glazing is preserved, which ensures clear vision through the glazing.

It is noted that, in the HUD systems of the prior art, the virtual image is obtained by projecting the information onto glazing (especially a windshield) having a laminated structure formed from two sheets of glass and a plastic insert. A drawback of these existing systems is that the conductor then sees a double image, a first image reflected by the surface of the glazing oriented toward the interior of the cockpit, and a second image by reflection of the outer surface of the glazing, these two images being slightly shifted relative to each other. This shift may disrupt the viewing of the information.

The invention makes it possible to overcome this problem. Specifically, when the layered element is integrated into an HUD system, as glazing or as a flexible film applied to the main surface of the glazing which receives the radiation from the projection source, the diffuse reflection on the first textured contact surface encountered by the radiation in the layered element may be markedly higher than the reflection on the outer surfaces in contact with the air. Thus, the double reflection is limited by promoting the reflection on the first textured contact surface of the layered element.

EXAMPLES

I. Preparation of Sol-Gel Solutions and of Sol-Gel Layers Comprising an Adjustable Refractive Index The sol-gel layers prepared in the examples comprise an organic/inorganic hybrid matrix of silica and of zirconium oxide in which are dispersed titanium dioxide particles. The main compounds used in the sol-gel solutions are:
- 3-glycidoxypropyltrimethoxysilane (GLYMO),
- zirconium propoxide in the form of a solution at 70% by mass in propanol,
- $TiO_2$, sold under the name Cristal Activ™, in the form of particles with a diameter of less than 50 nm in an aqueous dispersion with a solids content of 23% by mass.

A first precursor composition of the matrix is prepared by mixing the organosilane, the solution of zirconium propoxide, acetic acid and optionally water. The constituents are mixed dropwise with vigorous stirring. The other compounds are then added to this first composition, i.e. the aqueous dispersion of titanium dioxide in the form of particles, the surfactant and optionally other dilution solvents such as ethanol. The sol-gel solution is thus obtained.

Depending on the dispersion proportions of titanium dioxide added to the sol-gel solution, the matrix of the sol-gel layer once crosslinked will be more or less charged with $TiO_2$ particles. The refractive index of the sol-gel layer depends on the volume fraction of titanium dioxide. It is thus possible to vary the refractive index of the resulting sol-gel layer between 1.490 and 1.670 with a high-precision adjustment of the order of 0.001. It is thus possible to obtain for all types of standard glass substrates used as lower outer layer an index harmony of less than 0.015.

The solids content of the sol-gel layer has an influence on the maximum thickness that it is possible to deposit in one pass.

In order to illustrate these results, various sol-gel solutions were prepared. These solutions were then applied by spraying onto a support and crosslinked for a time of 20 minutes to a few hours at a temperature of 150° C. or 200° C. so as to form sol-gel layers having refractive indices varying between 1.493 to 1.670.

II. Influence of the Volume Proportions of $TiO_2$ on the Refractive Index of the Sol-Gel Layer The tables below summarize the compositions of the sol-gel solutions tested and also the compositions of the resulting sol-gel layers.

As regards the sol-gel solution, the given proportions correspond to the mass proportions relative to the total mass of the sol-gel solution.

|  | Sol-gel solution | | | | | | | | |
|---|---|---|---|---|---|---|---|---|---|
|  | A | B | C | D | E | F | G | H | I |
| Main compounds: | | | | | | | | | |
| GLYMO | 68.1 | 64.2 | 55.6 | 52.5 | 22.5 | 20.3 | 18.3 | 16.6 | 14.8 |
| Zirconium propoxide | 4.8 | 4.5 | 3.9 | 3.7 | 1.6 | 1.4 | 1.3 | 1.2 | 1.0 |
| $TiO_2$ | 0.0 | 2.8 | 4.2 | 6.5 | 3.5 | 5.1 | 6.6 | 7.8 | 9.1 |
| Additives | | | | | | | | | |
| Acetic acid | 4.3 | 4.0 | 3.5 | 3.3 | 1.4 | 1.3 | 1.1 | 1.0 | 0.9 |
| 3M-FC 4430 | 0.0 | 0.1 | 0.2 | 0.3 | 0.2 | 0.2 | 0.3 | 0.3 | 0.4 |
| Solvents | | | | | | | | | |
| Propanol | 2.0 | 1.9 | 1.7 | 1.6 | 0.7 | 0.6 | 0.5 | 0.5 | 0.4 |
| Water | 12.8 | 21.6 | 24.4 | 31.6 | 16.0 | 20.9 | 25.5 | 29.2 | 33.3 |
| Ethanol | 0.0 | 12.4 | 18.2 | 28.2 | 15.3 | 22.2 | 28.6 | 33.9 | 39.6 |
| Total | 100 | 100 | 100 | 100 | 100 | 100 | 100 | 100 | 100 |

As regards the sol-gel layer, the volume proportions of $TiO_2$ are defined relative to the total volume of the main components comprising the hybrid matrix of silica and of zirconium oxide and the $TiO_2$ particles. The proportions of the main components correspond to the mass proportions of the main compounds of the sol-gel layer relative to the total mass of main compounds.

|  | Sol-gel layer | | | | | | | | |
|---|---|---|---|---|---|---|---|---|---|
|  | A | B | C | D | E | F | G | H | I |
| Main compounds*: | | | | | | | | | |
| Gly-SiO2 | 96 | 91 | 87 | 82 | 79 | 72 | 65 | 59 | 53 |
| ZrO2 | 4 | 3 | 3 | 3 | 3 | 3 | 2 | 2 | 2 |
| TiO2 | 0 | 6 | 9 | 14 | 18 | 26 | 33 | 39 | 46 |
| Volume % of TiO2** | 0 | 3 | 5 | 8 | 9.8 | 15 | 20.1 | 24.7 | 30 |
| Measured index | 1.493 | 1.517 | 1.529 | 1.557 | 1.567 | 1.600 | 1.623 | 1.651 | 1.674 |
| Theoretical index | 1.493 | 1.515 | 1.528 | 1.549 | 1.564 | 1.599 | — | — | — |

Following the crosslinking of the organosilane and of the zirconium propoxide by hydrolysis reaction and condensation, a matrix is obtained in the sol-gel layer, this matrix being based on silicon oxide comprising a non-hydrolyzable organic group referred to hereinbelow as "Gly-SiO$_2$," and of zirconium oxide in which are dispersed the $TiO_2$ particles. These three compounds represent the main compounds of the sol-gel layer.

The volume fraction of titanium dioxide has a linear influence on the refractive index of the sol-gel layer for volume proportions of $TiO_2$ of less than 20%. For higher proportions, the refractive index continues to increase, but a fall in the slope of the curve is observed. However, once this curve has been determined, a person skilled in the art is capable of estimating, by approximation, the refractive index of a sol-gel layer comprising a volume fraction of $TiO_2$ of greater than 20%.

FIG. 6 shows the change in refractive index as a function of the volume proportions of $TiO_2$ in the sol-gel layer. The linear change in refractive index as a function of the proportions of $TiO_2$ is observed; it is linear for proportions of less than 20%.

The precision on the refractive index is $7 \times 10^{-4}$ for an error of 0.1% by volume on the amount of $TiO_2$.

III. SEM Observation

Observations by scanning electron microscopy were performed to ensure that the sol-gel layers make it possible to fill in thickness the roughness of the substrate and to obtain a flat upper surface. The images in FIG. 7 show satin-finish substrates of transparent rough glass Satinovo® from the company Saint-Gobain on which a sol-gel layer has been deposited via a sol-gel process. These substrates 4 mm thick comprise a main textured surface obtained by acid attack. These substrates are thus used as lower outer layer of the layered element. The mean height of the texturing designs of this lower outer layer, which corresponds to the roughness Ra of the textured surface of the glass Satinovo®, is between 1 and 5 µm. Its refractive index is 1.518 and its PV is between 12 and 17 µm.

In the left image showing in cutaway view the substrate Satinovo® covered with the sol-gel layer, it is clearly seen that the texture is formed by a plurality of designs that are hollowed or protruding relative to the general plane of the contact surface. The thickness of the sol-gel layer is 14.3 µm.

The right image shows a top view of the same substrate. The sol-gel layer has deliberately not been applied to the entire surface of the substrate Satinovo®. The sol-gel layer makes it possible to even out the roughness of the substrate.

IV. Evaluation of the Influence of the Index Harmony

In order to measure the effect of the variation of index of the sol-gel layer, various sol-gel solutions were prepared and deposited onto satin-finish substrates of transparent rough glass Satinovo® defined above. The thicknesses of the sol-gel layers deposited after drying are about 15 μm.

The aim of this test is to show the influence of the index harmony between the upper and lower outer layer on the optical properties of the glazing, such as:
- the light transmission values $T_L$ in the visible range as a percentage, measured according to standard ISO 9050: 2003 (illuminant D65; 2° observer),
- the haze transmission values (Haze T) as percentages, measured with a hazemeter according to standard ASTM D 1003 for incident radiation on the layered element on the lower outer layer side,
- the percentage lightness with the Haze-Gard hazemeter from BYK.

Furthermore, the quality "of vision" through the substrate thus coated was evaluated visually by 5 observers in a blind test, i.e. without the observers knowing the characteristics such as the refractive index or the index harmony of the sol-gel layers with the substrate. The observers attributed for each substrate coated with a sol-gel layer an assessment indicator chosen from: "−" not correct, "+" correct, "++" good, "+++" excellent.

To simplify this test, the central layer was omitted. However, the absence of the central layer does not modify the observed tendency regarding the properties studied.

The tables below summarize the compositions of the sol-gel solutions tested and the compositions of the resulting sol-gel layers.

The results obtained are collated in the table above.

why the lightness was also determined. It is found that, contrary to the haze values, which are virtually constant in the indicated index range, the lightness values reflect within this range a peak centered for refractive index values of the sol-gel layer about the index value of the substrate, i.e. 1.518. More particularly, good results are obtained for an index difference of less than 0.020 and excellent results are obtained for an index difference of less than 0.015, or even less than 0.005.

In conclusion, the absolute value of the index difference between the lower outer layer of index n1 and the upper outer sol-gel layer of index n2 is preferably less than 0.020, better still less than 0.015 and even better still less than 0.013.

V. Influence of the Lamination

In order to demonstrate that the lamination does not disrupt the optical performance qualities, comparative tests were performed between:
S1: a substrate Satinovo® coated with a sol-gel layer O,
S2: a substrate Satinovo® coated with a sol-gel layer O laminated with a flat glass by means of a PVB insert,
S3: a substrate Satinovo® coated with a PVB insert.

|    | TL (%) | Haze (%) | Lightness (%) |
|----|--------|----------|---------------|
| S1 | 90.1   | 1.88     | 92.5          |
| S2 | 88.5   | 1.22     | 99.4          |
| S3 | —      | 4.5      | 58            |

Although better results are obtained when the substrate is not laminated, the optical performance qualities are good in both cases. The lamination has the advantage of "flattening

| Sol-gel layer | Index 589 nm | Δn | TL (%) | Haze (%) | Lightness (%) | P1 | P2 | P3 | P4 | P5 |
|---|---|---|---|---|---|---|---|---|---|---|
| G | 1.623 | −0.105 | — | — | 20.7 | − | − | − | − | − |
| E | 1.566 | −0.048 | — | — | 76.9 | − | − | − | − | − |
| D | 1.557 | −0.039 | — | — | 87.4 | − | + | ++ | ++ | ++ |
| P | 1.532 | −0.014 | 89.8 | 0.3 | 94 | + | + | + | ++ | ++ |
| C | 1.529 | −0.010 | — | — | 97.5 | ++ | ++ | ++ | ++ | ++ |
| O | 1.524 | −0.006 | 90.0 | 0.5 | 98 | +++ | +++ | +++ | +++ | +++ |
| B | 1.517 | 0.002 | — | — | 98 | +++ | +++ | +++ | +++ | +++ |
| N | 1.514 | 0.000 | 89.8 | 0.5 | 100 | +++ | +++ | +++ | +++ | +++ |
| M | 1.508 | 0.010 | 90.0 | 0.5 | 98 | ++ | ++ | ++ | ++ | ++ |
| L | 1.504 | 0.014 | 89.6 | 0.4 | 96 | ++ | ++ | ++ | ++ | ++ |
| K | 1.500 | 0.018 | 90.0 | 0.5 | 93 | − | + | ++ | ++ | ++ |
| A | 1.493 | 0.025 | 89.9 | 1.1 | 90 | − | − | − | − | − |
| Q | 1.484 | 0.030 | 89.5 | 1.6 | 78 | − | − | − | − | − |
| R | 1.476 | 0.038 | 89.5 | 3.5 | 68 | − | − | − | − | − |
| S | 1.468 | 0.046 | 89.5 | 2.9 | 60 | − | − | − | − | − |

Δn represents the variation in index between the substrate Satinovo ® and the sol-gel layer.

FIG. 8 is a graph showing the change in haze (right-hand y-axis) and in lightness (left-hand y-axis) as a function of the refractive index of the sol-gel layer. The vertical black line illustrates the index of the glass substrate Satinovo®.

FIG. 9 is a graph showing the change in the haze (right-hand y-axis) and in the lightness (left-hand y-axis) as a function of the variation in refractive index between the substrate Satinovo® and the sol-gel layer.

When the sol-gel layer has an index of between 1.500 and 1.530, haze values through the substrate thus coated of less than 0.5% are obtained. However, the haze values alone do not suffice to characterize the excellence of vision. This is out" or effacing the imperfections of the main surface of the sol-gel layer. A completely flat outer surface is thus obtained, without any wavelet aspect and protected from dust.

It is interesting to note that a direct lamination without a sol-gel layer leads to a haze of 4.5% and a lightness of 58%, these values being entirely outside the admissible limits.

VI. Influence of the Presence of the Magnetron Layer

This test was performed with a transparent layered element comprising the following stack:

lower outer layer: glass substrate Satinovo® of 4 mm or 6 mm,
central layer: stack of layers comprising at least one silver-based layer deposited by magnetron sputtering,
upper outer layer: sol-gel layer O,
additional upper layer: PVB insert,
additional upper layer: flat glass of 4 mm.

The presence of the central layer deposited by magnetron gives the layered element an intrinsic haze effect arising from the reflections on the central layer. Even in the case of a perfect index harmony, haze is then obtained. The haze value depends on the properties of the central layer.

The sol-gel layer is applied. Finally, the assembly is laminated by placing in contact a PVB insert 0.38 mm thick with the sol-gel layer and a flat glass Planilux®. The satin-finish flat glasses have a thickness of 4 mm for the first two examples with the SKN layers and 6 mm for the last two.

The stack of layers of the central layer is described, for example, in patent applications WO 02/48065 and EP 0 847 965. The central layers, when they are deposited on a flat surface, have the characteristics given below.

|  | TL(%) | Re % | Ri % |
|---|---|---|---|
| SKN165 | 60 | 16 | 17 |
| SKN154 | 50 | 18 | 28 |
| PB120 | 20 | 21 | 31 |
| SS108 | 8 | 42 | 37 |

In the table below, the haze and lightness values were measured for different elements in layers comprising as central layer stacks of silver-based layers deposited by magnetron. It is then observed that the haze is increased and may reach relatively high values, of a few percent. On the other hand, the lightness remains very high with values above 97%. This makes it possible to have glazings with a very good quality of vision in transmission.

| Elements with layers | TL (%) | Haze (%) | Lightness (%) |
|---|---|---|---|
| E1: SKN165 | 52.7 | 4.5 | 97.8 |
| E2: SKN154 | 46.1 | 4.3 | 97.5 |
| E3: PB120 | 26.2 | 2.9 | 98.5 |
| E4: SS108 | 12.4 | 3.5 | 98.1 |

The invention claimed is:

1. A transparent layered element having two main smooth outer surfaces, the transparent layered element comprising:
a lower outer layer and an upper outer layer, which each form one of the two main outer surfaces of the transparent layered element and which consist of dielectric materials having substantially the same refractive index, and
a central layer intercalated between the lower outer and upper outer layers, the central layer being formed either (a) by a single layer which is a dielectric layer of refractive index different from that of the lower outer and upper outer layers or a metallic layer, or (b) by a stack of layers which comprises at least one dielectric layer with a refractive index different from that of the lower outer and upper outer layers or a metallic layer, wherein each contact surface between two adjacent layers of the transparent layered element, one of which is a dielectric layer and the other is a metallic layer or which are both dielectric layers with different refractive indices, is textured and parallel to other textured contact surfaces between two adjacent layers, one of which is a dielectric layer and the other is a metallic layer or which are both dielectric layers with different refractive indices,
wherein the upper outer layer is a sol-gel layer comprising an organic/inorganic hybrid matrix based on silica,
wherein a smooth surface has a roughness parameter corresponding to an arithmetic mean difference Ra of less than 0.10 μm and a textured surface has a roughness parameter corresponding to the arithmetic mean difference Ra of at least 0.5 μm,
wherein the absolute value of the difference in refractive index at 589 nm between constituent dielectric materials of the lower outer and upper outer layers of the transparent layered element is less than or equal to 0.020, and
wherein the transmission haze of the transparent layered element is less than 5% and the lightness of the transparent layered element is greater than 93%.

2. The transparent layered element as claimed in claim 1, wherein the absolute value of the difference in refractive index at 589 nm between the lower outer and upper outer layers and at least one dielectric layer of the central layer is greater than or equal to 0.3.

3. The transparent layered element as claimed in claim 1, wherein the sol-gel layer also comprises particles of at least one metal oxide or of at least one chalcogenide.

4. The transparent layered element as claimed in claim 1, wherein the silica-based organic/inorganic hybrid matrix also comprises at least one metal oxide.

5. The transparent layered element as claimed in claim 3, wherein the metal oxide comprises a metal chosen from titanium, zirconium, zinc, niobium, aluminum and molybdenum.

6. The transparent layered element as claimed in claim 1, wherein the sol-gel layer comprises an organic/inorganic hybrid matrix of silica and of zirconium oxide in which are dispersed titanium dioxide particles.

7. The transparent layered element as claimed in claim 1, wherein the sol-gel layer is obtained by curing a sol-gel solution and comprises the product resulting from the hydrolysis and condensation of at least one organosilane of general formula $R_nSiX_{(4-n)}$ in which:
n is equal to 1, 2, 3,
the groups X, which are identical or different, represent hydrolyzable groups chosen from alkoxy, acyloxy or halide groups, and
the groups R, which are identical or different, represent non-hydrolyzable organic groups bonded to silicon via a carbon atom.

8. The transparent layered element as claimed in claim 1, wherein the sol-gel layer is obtained by curing a sol-gel solution and comprises the product resulting from the hydrolysis and condensation of:
i) at least one organosilane and
ii) at least one precursor of a metal oxide or
iii) particles of at least one metal oxide or of at least one chalcogenide, or both ii) at least one precursor of a metal oxide and iii) particles of at least one metal oxide or of at least one chalcogenide.

9. The transparent layered element as claimed in claim 1, further comprising at least one additional layer positioned above or below the upper and/or lower outer layers, chosen from:
transparent substrates chosen from polymers, glasses and ceramics comprising two smooth main surfaces, curable materials that are initially in a viscous, liquid or pasty state suitable for forming operations, inserts made of thermoformable or pressure-sensitive plastic material.

10. The transparent layered element as claimed in claim 1, wherein the lower outer layer of the layered element is chosen from:

transparent substrates, one of the main surfaces of which is textured and the other smooth, a layer of dielectric material chosen from the oxides, nitrides or halides of one or more transition metals, non-metals or alkaline-earth metals, a layer based on curable materials that are initially in a viscous, liquid or pasty state, suited to forming operations comprising:

photocrosslinkable and/or photopolymerizable materials, layers deposited via a sol-gel process, inserts made of thermoformable or pressure-sensitive plastic material.

11. The transparent layered element as claimed in claim 1, wherein the single layer or the stack of layers of the central layer comprises:

at least one thin layer consisting of a dielectric material chosen from the oxides, nitrides or halides of one or more transition metals, non-metals or alkaline-earth metals, at least one thin metallic layer, especially a thin layer of silver, gold, copper, titanium, niobium, silicon, aluminum, nickel-chromium (NiCr) alloy, stainless steel, or an alloy thereof.

12. A process for manufacturing a transparent layered element as defined according to claim 1, comprising:

providing a transparent substrate, one of the main surfaces of which is textured and the other main surface is smooth, as lower outer layer;

depositing a central layer on a main textured surface of the lower outer layer, said depositing comprising, (a) when the central layer is formed by a single layer, which is a dielectric layer with a refractive index different from that of the lower outer layer or a metallic layer, depositing the central layer in compliant manner onto said main textured surface, or (b) when the central layer is formed by a stack of layers comprising at least one dielectric layer with a refractive index different from that of the lower outer layer or a metallic layer, depositing the layers of the central layer successively in compliant manner onto said main textured surface, and forming the upper outer sol-gel layer on the main textured surface of the central layer opposite the lower outer layer, where the lower and upper outer layers consist of dielectric materials having substantially the same refractive index, by deposition via a sol-gel process.

13. A method comprising utilizing a layered element as claimed in claim 1, as all or part of glazing for a vehicle, for a building, for street furniture, for interior furniture, for a display screen or for a head-up display system.

14. The transparent layered element as claimed in claim 1, wherein the absolute value of the difference is less than or equal to 0.015.

15. The transparent layered element as claimed in claim 2, wherein the absolute value of the difference is greater than or equal to 0.5.

16. The transparent layered element as claimed in claim 7, wherein n is equal to 1 or 2.

17. The transparent layered element as claimed in claim 16, wherein n is equal to 1.

18. The transparent layered element as claimed in claim 7, wherein the groups X are alkoxy groups.

19. The transparent layered element as claimed in claim 10, wherein the transparent substrates are chosen from polymers, glasses and ceramics.

20. The transparent layered element as claimed in claim 10, wherein the thermoformable or pressure-sensitive plastic material are based on polymers chosen from polyvinyl butyrals (PVB), polyvinyl chlorides (PVC), polyurethanes (PU), polyethylene terephthalates (PET) or ethylene-vinyl acetate (EVA) copolymers.

21. The process according to claim 12, further comprising forming at least one upper and/or lower additional layer on the main outer smooth surface of the layered element.

* * * * *